(12) United States Patent
Cordova

(10) Patent No.: US 10,692,659 B2
(45) Date of Patent: Jun. 23, 2020

(54) HIGH ENERGY AND POWER ELECTROCHEMICAL DEVICE AND METHOD OF MAKING AND USING SAME

(71) Applicant: ADA Technologies, Inc., Littleton, CO (US)

(72) Inventor: Stephen Cordova, Colorado Springs, CO (US)

(73) Assignee: ADA Technologies, Inc., Littleton, CO (US)

(*) Notice: Subject to any disclaimer, the term of this patent is extended or adjusted under 35 U.S.C. 154(b) by 668 days.

(21) Appl. No.: 15/224,168

(22) Filed: Jul. 29, 2016

(65) Prior Publication Data

US 2017/0033371 A1 Feb. 2, 2017

Related U.S. Application Data

(60) Provisional application No. 62/199,640, filed on Jul. 31, 2015.

(51) Int. Cl.
| | | |
|---|---|---|
| *H01G 11/06* | (2013.01) | |
| *H01M 4/38* | (2006.01) | |
| *H01M 6/32* | (2006.01) | |
| *H01G 11/10* | (2013.01) | |
| *H01G 11/26* | (2013.01) | |
| *H01G 11/50* | (2013.01) | |

(Continued)

(52) U.S. Cl.
CPC ............ *H01G 11/10* (2013.01); *H01G 11/12* (2013.01); *H01G 11/26* (2013.01); *H01G 11/50* (2013.01); *H01G 11/58* (2013.01); *H01M 2/361* (2013.01); *H01M 2/362* (2013.01); *H01M 4/13* (2013.01); *H01M 10/05* (2013.01); *H01G 11/52* (2013.01)

(58) Field of Classification Search
CPC ........ H01G 11/10; H01G 11/12; H01G 11/58; H01G 11/50; H01G 11/26; H01G 11/52; H01M 10/05; H01M 4/13; H01M 2/362; H01M 2/361
See application file for complete search history.

(56) References Cited

U.S. PATENT DOCUMENTS

| | | |
|---|---|---|
| 3,759,746 A | 9/1973 | McCallum |
| 4,310,609 A | 1/1982 | Liang et al. |

(Continued)

FOREIGN PATENT DOCUMENTS

| | | |
|---|---|---|
| EP | 2613389 | 7/2013 |
| WO | WO 99/01902 | 1/1999 |

(Continued)

OTHER PUBLICATIONS

U.S. Appl. No. 15/660,772, filed Jul. 26, 2017, Xing.

(Continued)

*Primary Examiner* — Lisa S Park
(74) *Attorney, Agent, or Firm* — Sheridan Ross, P.C.

(57) ABSTRACT

An electrolyte is introduced into an electrochemical device, passed, via a first corrugation feature, through a first electrode of the electrochemical device, passed through an ion permeable separator, and contacted with a second electrode. The first or second electrode comprises a second corrugation feature in fluid communication with the first corrugation feature to contact the electrolyte across a portion of an active surface of the first or second electrode.

22 Claims, 21 Drawing Sheets

(51) Int. Cl.
*H01G 11/58* (2013.01)
*H01M 2/36* (2006.01)
*H01M 4/13* (2010.01)
*H01M 10/05* (2010.01)
*H01G 11/12* (2013.01)
*H01G 11/52* (2013.01)

(56) References Cited

U.S. PATENT DOCUMENTS

| | | |
|---|---|---|
| 4,681,823 A | 7/1987 | Tung et al. |
| 5,045,415 A | 9/1991 | Witehira |
| 5,557,497 A | 9/1996 | Ivanov et al. |
| 5,626,989 A * | 5/1997 | Doundoulakis ......... H01M 2/28 |
| | | 29/2 |
| 5,631,104 A | 5/1997 | Zhong et al. |
| 6,613,383 B1 | 9/2003 | George et al. |
| 6,713,177 B2 | 3/2004 | George et al. |
| 6,913,827 B2 | 7/2005 | George et al. |
| 6,958,174 B1 | 10/2005 | Klaus et al. |
| 7,026,070 B2 | 4/2006 | Noguchi et al. |
| 7,081,267 B2 | 7/2006 | Yadav |
| 7,081,367 B2 | 7/2006 | Shiraishi |
| 7,132,697 B2 | 11/2006 | Weimer et al. |
| 7,211,236 B2 | 5/2007 | Stark et al. |
| 7,396,862 B2 | 7/2008 | Weimer et al. |
| 7,413,982 B2 | 8/2008 | Levy |
| 7,426,067 B1 | 9/2008 | Bright et al. |
| 7,494,746 B2 | 2/2009 | Tarnopolsky |
| 7,553,686 B2 | 6/2009 | George et al. |
| 7,658,340 B2 | 2/2010 | Pfeffer et al. |
| 7,674,557 B2 | 3/2010 | Sun et al. |
| 7,790,317 B1 | 9/2010 | Poeppelmeier et al. |
| 7,833,437 B2 | 11/2010 | Fan et al. |
| 7,851,580 B2 | 12/2010 | Li et al. |
| 8,124,179 B2 | 2/2012 | Nilsen et al. |
| 8,133,462 B2 | 3/2012 | Jouanneau et al. |
| 8,133,531 B2 | 3/2012 | King et al. |
| 8,137,844 B2 | 3/2012 | Awano et al. |
| 8,163,336 B2 | 4/2012 | Weimer et al. |
| 8,187,731 B2 | 5/2012 | Weimer et al. |
| 8,439,283 B2 | 5/2013 | Pfeffer et al. |
| 8,531,090 B2 | 9/2013 | Spencer, II |
| 8,637,156 B2 | 1/2014 | Weimer et al. |
| 8,735,003 B2 | 5/2014 | Kim et al. |
| 8,785,030 B2 | 7/2014 | Ueda |
| 8,808,901 B2 | 8/2014 | Wang et al. |
| 8,894,723 B2 | 11/2014 | Nilsen et al. |
| 8,956,761 B2 | 2/2015 | Reynolds et al. |
| 8,993,051 B2 | 3/2015 | Kelder et al. |
| 9,005,816 B2 | 4/2015 | Amine et al. |
| 9,054,375 B2 | 6/2015 | Choi et al. |
| 9,059,451 B2 | 6/2015 | Xiao et al. |
| 9,093,707 B2 | 7/2015 | Lee et al. |
| 9,107,851 B2 | 8/2015 | Dave et al. |
| 9,243,330 B2 | 1/2016 | Granneman et al. |
| 9,246,164 B2 | 1/2016 | Lu et al. |
| 9,627,691 B2 | 4/2017 | Xing et al. |
| 9,755,235 B2 | 9/2017 | Xing |
| 9,887,421 B2 | 2/2018 | Xing et al. |
| 2001/0041294 A1 | 11/2001 | Chu et al. |
| 2002/0012844 A1 | 1/2002 | Gan et al. |
| 2003/0054250 A1 | 3/2003 | Kweon et al. |
| 2004/0194691 A1 | 10/2004 | George et al. |
| 2005/0238949 A1 | 10/2005 | Morris et al. |
| 2006/0035147 A1 | 2/2006 | Lam et al. |
| 2006/0115738 A1 | 6/2006 | Sazhin et al. |
| 2006/0269834 A1 | 11/2006 | West et al. |
| 2007/0212604 A1 | 9/2007 | Ovshinsky et al. |
| 2007/0275284 A1 | 11/2007 | Merritt et al. |
| 2007/0281089 A1 | 12/2007 | Heller et al. |
| 2009/0047570 A1 * | 2/2009 | Harper ............... H01M 8/0263 |
| | | 429/72 |
| 2009/0090640 A1 | 4/2009 | Jang et al. |
| 2009/0155590 A1 | 6/2009 | Kelder et al. |
| 2009/0214927 A1 | 8/2009 | Dadheech et al. |
| 2010/0035152 A1 | 2/2010 | Sastry et al. |
| 2010/0047695 A1 | 2/2010 | Smart et al. |
| 2010/0109130 A1 | 5/2010 | Pinna et al. |
| 2010/0123993 A1 | 5/2010 | Laor |
| 2010/0178481 A1 | 7/2010 | George et al. |
| 2010/0273059 A1 | 10/2010 | Sano |
| 2010/0310908 A1 | 12/2010 | Zhang et al. |
| 2011/0027658 A1 | 2/2011 | Kim et al. |
| 2011/0149473 A1 | 6/2011 | Eilertsen et al. |
| 2011/0184482 A1 | 7/2011 | Eberman et al. |
| 2011/0200863 A1 | 8/2011 | Xiao et al. |
| 2011/0236575 A1 | 9/2011 | King et al. |
| 2011/0311882 A1 | 12/2011 | Kim et al. |
| 2011/0318629 A1 * | 12/2011 | Ho ..................... H01M 2/1606 |
| | | 429/144 |
| 2012/0053397 A1 | 3/2012 | Deegan et al. |
| 2012/0088164 A1 | 4/2012 | Foster et al. |
| 2012/0094213 A1 | 4/2012 | Ha et al. |
| 2012/0121932 A1 | 5/2012 | George et al. |
| 2012/0126182 A1 | 5/2012 | Zhang et al. |
| 2012/0145953 A1 | 6/2012 | Pallem et al. |
| 2012/0161456 A1 | 6/2012 | Riedmayr et al. |
| 2012/0244395 A1 * | 9/2012 | Perry ................. H01M 8/0265 |
| | | 429/51 |
| 2012/0293110 A1 | 11/2012 | Spruce et al. |
| 2012/0301778 A1 | 11/2012 | Trevey et al. |
| 2013/0029217 A1 | 1/2013 | Bhat et al. |
| 2013/0045328 A1 | 2/2013 | Adzic et al. |
| 2013/0065137 A1 | 3/2013 | Ndzebet et al. |
| 2013/0075647 A1 | 3/2013 | Gadkaree |
| 2013/0187618 A1 | 7/2013 | Suppes |
| 2013/0244063 A1 | 9/2013 | Dhar et al. |
| 2013/0260229 A1 | 10/2013 | Uzun et al. |
| 2014/0023932 A1 | 1/2014 | Zhang et al. |
| 2014/0045033 A1 | 2/2014 | Zhang et al. |
| 2014/0093754 A1 | 4/2014 | Hamers et al. |
| 2014/0106186 A1 | 4/2014 | Dudney et al. |
| 2014/0162132 A1 | 6/2014 | Ishii et al. |
| 2014/0170524 A1 | 6/2014 | Chiang et al. |
| 2014/0234732 A1 | 8/2014 | Park et al. |
| 2014/0255759 A1 | 9/2014 | Scordilis-Kelley et al. |
| 2014/0272578 A1 | 9/2014 | Xiao et al. |
| 2014/0328005 A1 | 11/2014 | Oh et al. |
| 2014/0340818 A1 | 11/2014 | Xie et al. |
| 2015/0037660 A1 | 2/2015 | Bedjaoui et al. |
| 2015/0064537 A1 | 3/2015 | Christensen et al. |
| 2015/0104715 A1 * | 4/2015 | Dudenbostel ........... H01M 4/14 |
| | | 429/241 |
| 2015/0152549 A1 | 6/2015 | King et al. |
| 2015/0162606 A1 | 6/2015 | Kelder et al. |
| 2015/0180023 A1 | 6/2015 | Xiao et al. |
| 2015/0194701 A1 | 7/2015 | Kim et al. |
| 2015/0225853 A1 | 8/2015 | Mantymaki et al. |
| 2015/0270532 A1 | 9/2015 | Sastry et al. |
| 2015/0357650 A1 | 12/2015 | Lakshmanan et al. |
| 2016/0043429 A1 | 2/2016 | Hatta et al. |
| 2016/0211547 A1 | 7/2016 | Hwang et al. |
| 2016/0329602 A1 | 11/2016 | Kojima |
| 2016/0344060 A1 | 11/2016 | Asano et al. |
| 2016/0351910 A1 | 12/2016 | Albano et al. |
| 2016/0351973 A1 | 12/2016 | Albino et al. |
| 2017/0084401 A1 | 3/2017 | Xing |
| 2017/0263935 A1 | 9/2017 | Kozen et al. |
| 2017/0373318 A1 | 12/2017 | Xing |
| 2018/0159163 A1 * | 6/2018 | Hanafusa ................. H01M 8/18 |

FOREIGN PATENT DOCUMENTS

| | | |
|---|---|---|
| WO | WO 2007/098478 | 8/2007 |
| WO | WO 2008/138132 | 11/2008 |
| WO | WO 2011/098233 | 8/2011 |
| WO | WO 2013/011297 | 1/2013 |
| WO | WO 2015/030407 | 3/2015 |
| WO | WO 2015/106769 | 7/2015 |
| WO | WO 2015/153584 | 10/2015 |
| WO | WO 2015/189284 | 12/2015 |

(56) References Cited

FOREIGN PATENT DOCUMENTS

| WO | WO 2015/197589 | 12/2015 |
|---|---|---|
| WO | WO 2016/196445 | 12/2016 |

OTHER PUBLICATIONS

U.S. Appl. No. 15/821,092, filed Nov. 22, 2017, Xing.
U.S. Appl. No. 15/928,840, filed Mar. 22, 2018, Xing.
"Lithium-air battery," retrieved from http://en.wikipedia.org/wiki/Lithium%E2%80%93air_battery, retrieved on May 26, 2015, 11 pages.
Ahn et al, "Extended Lithium Titanate Cycling Potential Window with Near Zero Capacity Loss," Electrochemistry Communications 13 (2011), pp. 796-799.
Aravindan et al. "Atomic layer deposited (ALD)SnO2 anodes with exceptional cycleability for Li-ion batteries," Nano Energy, Sep. 2013, vol. 2, No. 5, pp. 720-725.
Arrebola et al. "PMMA-assisted synthesis of Li1-xNi0.5Mn1.5O4-d for high-voltage lithium batteries with expanded rate capability at high cycling temperatures", Journal of Power Sources, Jun. 2008, vol. 180(2), pp. 852-858, 1 page, abstract only.
Ban et al., "Atomic layer deposition of amorphous TiO2 on graphene as an anode for Li-ion batteries," Nanotechnology, 2013, vol. 24, 424002, 6 pages.
Boukhalfa et al, "Atomic Layer Deposition of Vanadium Oxide on Carbon Nanotubes for High-Power Supercapacitor Electrodes", Energy & Environmental Science, 2012, vol. 5, pp. 6872-6879.
Beetstra et al., "Improved Li-ion Battery Performance by Coating Cathode Nano-Particles Using Atomic Layer Deposition," Refereed Proceedings of the 12th International Conference on Fluidization—New Horizons in Fluidization Engineering (2007) pp. 369-376.
Bloom, et al, "Effect of Interface Modifications on Voltage Fade in 0.5Li2MnO3—0.5LiNi0.375Co0.25)2, Cathode Materials," Journal of Power Sources, Mar. 2014, vol. 249, pp. 509-514.
Chemelewski et al., "Factors Influencing the Electrochemical Properties of High-Voltage Spinel Cathodes: Relative Impact of Morphology and Cation Ordering," Chem. Mater., 2013, vol. 25, pp. 2890-2897.
Cho et al., "Effect of Surface Modification on Nano-Structured LiNi0.5Mn1.5O4 Spinel Materials," ACS Applied Materials & Interfaces, Jul. 2015, vol. 7, No. 30, pp. 16231-16239 (Abstract Only).
Christensen et al., "A Critical Review of Li/Air Batteries," Journal of the Electrochemical Society, 2012, vol. 159(2), pp. R1-R30.
Dai et al., "Surface modified CFx cathode material for ultrafast discharge and high energy density," J. Mater. Chem. A, 2014, vol. 2, pp. 20896-20901, 1 page, abstract only.
Dobley et al., "High Capacity Cathodes for Lithium-Air Batteries," Yardney Technical Products, Inc./Lithion, Inc., 2004, 1 page.
Donders et al. "Atomic Layer Deposition of LiCoO2 Thin-Film Electrodes for All-Solid-State Li-Ion Micro-Batteries," Journal of the Electrochemical Society, 2013, vol. 160, No. 5, pp. A3066-A3071.
Elam et al., "Viscous flow reactor with quartz crystal microbalance for thin film growth by atomic layer deposition," Review of Scientific Instruments, vol. 73(8), 2002, pp. 2981-2987.
Glass et al., "Lithium ion conduction in rapidly quenched Li2O—Al2O3, Li2O—Ga2O3, and Li2O—Bi2O3 glasses," Journal of Applied Physics, 1980, vol. 51(7), p. 3756, 1 page, abstract only.
Han et al., "Atomic-Layer-Deposition Oxide Nanoglue for Sodium Ion Batteries," Nano Letters, Nov. 2013, vol. 14, No. 1, pp. 139-147.
Hao et al., "Two-step hydrothermal synthesis of submicron Li1+XNi0.5Mn1.5O4-δ for lithium-ion battery cathodes (x=0.02, δ=0.12)," Dalton Trans., 2012, vol. 41, pp. 8067-8076.
He et al., "Alumina-Coated Patterned Amorphous Silicon as the Anode for a Lithium-Ion Battery with High Coulombic Efficiency," Advanced Materials, Nov. 2011, vol. 23, No. 42, pp. 4938-4941.
Hu et al., "Oxygen-Release-Related Thermal Stability and Decomposition Pathways of LixNi0.5Mn1.5O4 Cathode Materials," Chem. Mater., 2014, vol. 26, pp. 1108-1118.
Jung et al, "Effects of Atomic Layer Deposition of Al2O3 on the Li[Li 0.20Mn0.54Ni0.13]O2 Cathode for Lithium-Ion Batteries," Journal of the Electrochemical Society (2011), vol. 158, Issue 12, pp. A1298-A1302.
Jung et al, "Unexpected Improved Performance of ALO Coated LiCoO2/Graphite Li-ion Batteries," Advanced Energy Materials, Feb. 2013, vol. 3, No. 2, pp. 213-219.
Jung et al., "Enhanced Stability of LiCoO2 Cathodes in Lithium-Ion Batteries Using Surface Modification by Atomic Layer Deposition," Journal of the Electrochemical Society, 2010, vol. 157, No. 1, A75-A81.
Jung et al., "Enhanced Stability of LiCoO2 Cathodes in Lithium-ion Batteries Using Surface Modification by Atomic Layer Deposition," Journal of the Korean Ceramic Society (2010), vol. 47, No. 1, pp. 61-65.
Jung et al., "Ultrathin Direct Atomic Layer Deposition on Composite Electrodes for Highly Durable and Safe Li-Ion Batteries," Advanced Materials, May 2010, vol. 22, No. 19, pp. 2172-2176.
Kamaya et al. "A lithium superionic conductor," Nature Materials, Sep. 2011, vol. 10, pp. 682-686.
Kang et al., "Fe3O4 Nanoparticles Confined in Mesocellular Carbon Foam for High Performance Anode Materials for Lithium-Ion Batteries," Advanced Functional Materials, Jul. 2011, vol. 21, No. 13, pp. 2430-2438.
Kim et al., "Plasma-Enhanced Atomic Layer Deposition of Ultrathin Oxide Coatings for Stabilized Lithium-Sulfur Batteries," Advanced Energy Materials, Oct. 2013, vol. 3, No. 10, pp. 1308-1315.
Kim et al., "Unexpected High Power Performance of Atomic Layer Deposition Coated Li[Ni1/3Mn1/3C01/3]), Cathodes," Journal of Power Sources, May 2014, vol. 254, pp. 190-197.
Kunduraci et al., "High-Power Nanostructured LiMn2-xNixO4 High-Voltage Lithium-Ion Battery Electrode Materials: Electrochemical Impact of Electronic Conductivity and Morphology," Chem. Mater., 2006, vol. 18, pp. 3585-3592.
Kunduraci et al., "Synthesis and Characterizaton of Nanostructured 4.7 V LixMn1.5Ni0.5O4 Spinels for High-Power Lithium-Ion Batteries," J. The Electrochem. Soc., 2006, vol. 153(7), pp. A1345-A1352.
Lahiri et al., "Ultrathin alumina-coated carbon nanotubes as an anode for high capacity Li-ion batteries," Journal of Materials Chemistry, 2011, vol. 21, No. 35, pp. 13621-13626.
Lee et al, Atomic Layer Deposition of TiO2 on Negative Electrode for Lithium Ion Batteries,: Journal of Power Sources , Dec. 2013, vol. 244, pp. 410-416.
Lee et al, "Low-temperature Atomic Layer Deposited Al2O3 Thin Film on Layer Structure Cathode for Enhanced Cycleability in Lithium-ion Batteries," Electrochimica Acta 55 (2010), pp. 4002-4006.
Lee et al, "Roles of Surface Chemistry on Safety and Electrochemistry in Lithium Ion Batteries," Acc Chem Res, Apr. 2012, vol. 46, No. 5, pp. 1161-1170.
Lee et al., "The effect of TiO2 coating on the electrochemical performance of ZnO nanorod as the anode material for lithium-ion battery," Applied Physics A, Mar. 2011, vol. 102, No. 3, pp. 545-550.
Leung et al, "Using Atomic Layer Deposition to Hinder Solvent Decomposition in Lithium Ion Batteries: First-Principles Modeling and Experimental Studies," Journal of the American Chemical Society (2011), vol. 133, No. 37, pp. 14741-14754.
Li et al, "Artificial Solid Electrolyte Interphase to Address the Electrochemical Degradation of Silicon Electrodes," Applied Materials & Interfaces, Jun. 13, 2014, vol. 6, No. 13, pp. 10083-10088.
Li et al, "Synthesis Characterization and Electrochemical Performance of AlF3-coated Li1.2(Mn0.54Ni0.16Co0.08)O2 as Cathode for Li-ion Battery," Science Press, Trans. Nonferrous Met. Soc. China Nov. 2014, vol. 24, No. 11, pp. 3534-3540 (Abstract Only).
Li et al., "Significant impact on cathode performance lithium-ion batteries by precisely controlled metal oxide nanocoatings via atomic layer deposition," Journal of Power Sources, Feb. 2014, vol. 247, pp. 57-69.

(56) References Cited

OTHER PUBLICATIONS

Li et al., "The improved discharge performance of LiCFx batteries by using multi-walled carbon nanotubes as conductive additive," Journal of Power Sources, 2011, vol. 196, pp. 2246-2250.
Li et al., "Tin Oxide with Controlled Morphology and Crystallinity by Atomic Layer Deposition onto Graphene Nanosheets for Enhanced Lithium Storage," Advanced Functional Materials, Apr. 2012, vol. 22, No. 8, pp. 1647-1654.
Lin et al., "Chemical and Structural Stability of Lithium-Ion Battery Electrode Materials under Electron Beam," Scientific Reports, Jul. 16, 2014, vol. 4, 5694, 6 pages.
Liu et al, "Lithium-rich Li1.2Ni0.13Co0.13Mn0.54O2 oxide coated by Li3PO4 and carbon nanocomposite layers as high performance cathode materials for lithium ion batteries," Journal of Materials Chemistry A, 2015, vol. 3, No. 6, pp. 2634-2641 (Abstract Only).
Liu et al., "Rational Design of Atomic-Layer-Deposited LiFePO4 as a High-Performance Cathode for Lithium-Ion Batteries," Advanced Materials, vol. 26, No. 37, Oct. 8, 2014, pp. 6472-6477.
Liu et al., "Ultrathin atomic layer deposited ZrO2 coating to enhance the electrochemical performance of Li4 Ti5O12 as an anode material," Electrochimica Acta 93 (2013), pp. 195-201.
Lu et al, "Effectively Suppressing Dissolution of Manganese from Spinel Lithium Manganate via a Nanoscale Surface-doping Approach," Nature Communications, Dec. 16, 2014., No. 5, 5693, 8 pages.
Maeda et al., "Effect of deviation from Ni/Mn Stoichiometry in Li[Ni1/2Mn3/2]O4 upon rechargeable capacity at 4.7 V in nonaequeous lithium cells," J. Ceramic Soc. of Japan, 2009, vol. 117(11), pp. 1216-1220.
Meng et al., "Emerging Applications of Atomic Layer Deposition for Lithium-Ion Battery Studies," Advanced Materials, Jul. 2012, vol. 24, No. 27, pp. 3589-3615.
Nanda, "Studies on Lithium Manganese Rich MNC Composite Cathodes," Oack Ridge National Laboratory, Project ID #ES106, May 16, 2013. 23 pages.
Oh, "Superior Long-Term Energy Retention and Volumetric Energy Density for Li-Rich Cathode Materials," Nano Letters, Sep. 2014, vol. 14, No. 10, pp. 5965-5972 (Abstract Only).
Piper et al., "Reversible High-Capacity Si Nanocomposite Anodes for Lithium-ion Batteries Enabled by Molecular Layer Deposition," 224th ECS Meeting, The Electrochemical Society, 2013, Abstract #954.
Ramasamy, et al., "Discharge characteristics of silver vanadium oxide cathodes," Journal of Applied Electrochemistry, 2006, vol. 36, pp. 487-497.
Rangasamy et al., "Pushing the Theoretical Limit of LiCFx Batteries: A tale of Bifunctional Electrolyte," Journal of the American Chemical Society, 2014, vol. 136, pp. 6874-6877.
Read, et al., "LiF Formation and Cathode Swelling in the Li/CFx Battery," Journal of the Electrochemical Society, 2011, vol. 158(5), pp. A504-A510, 1 page, abstract only.
Riley et al., "Electrochemical effects of ALD surface modification on combustion synthesized LiNi1/3Mn1/3O2 as a layered-cathode material," Journal of Power Sources, Mar. 2011, vol. 196, No. 6, pp. 3317-3324.
Sauvage, et al., "Room-Temperature Synthesis Leading to Nanocrystalline Ag2V4O11," J. Am. Chem. Soc., 2010, vol. 132(19), pp. 6778-6782.
Sun et al., "Atomic Layer Deposition of TiO2 on Graphene for Supercapacitors," Journal of the Electrochemical Society, 2012, vol. 159(4), pp. A364-A369.
Sun et al, "Pseudocapacitance of Amorphous TiO2 Thin Films Anchored to Graphene and Carbon Nanotubes Using Atomic Layer Deposition", The Journal of Physical Chemistry C, 2013, vol. 117 (44), pp. 22497-22508.
Takeuchi et al., "Reduction of Silver Vanadium Oxide in Lithium/Silver Vanadium Oxide Cells," Journal of the Electrochemical Society, Nov. 1988, vol. 135(11), pp. 2691-2694.
Unocic et al., "Direct Visualization of Solid Electrolyte Interphase Formation in Lithium-Ion Batteries with In Situ Electrochemical Transmission Electron Microscopy," Microscopy and Microanalysis, Aug. 2014, vol. 20, No. 4, pp. 1029-1037 (Abstract Only).
Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources, Jul. 2013, vol. 233, pp. 1-5.
Wang, et al., "Determination of Chemical Diffusion Coefficient of Lithium Ion in Graphitized Mesocarbon Microbeads with Potential Relaxation Technique," Journal of the Electrochemical Society, 2001, vol. 148(7), pp. A737-A741, 1 page, abstract only.
Wei et al., "Effects of Ni Doping on [MnO6] Octahedron in LiMn2O4," J. Phys. Chem. B, 2004, vol. 108, pp. 18547-18551.
Wu et al., "An Alumina-Coated Fe3O4-Reduced Graphene Oxide Composite Electrode as a Stable Anode for Lithium-ion Battery," Electrochimica Acta, Feb. 2015, vol. 156, pp. 147-153 (Abstract Only).
Xiao et al, "Ultrathin Multifunctional Oxide Coatings for Lithium Ion Batteries," Advanced Materials, Sep. 2011, vol. 23, No. 34, pp. 3911-3915.
Xiao et al. "High-Performance LiNi0.5Mn1.5O4 Spinel Controlled by Mn3+ Concentration and Site Disorder", Advanced Materials, 2012, vol. 24(16), pp. 2109-2116, 2 pages, abstract only.
Xiao et al., "Unravelling the Role of Electrochemically Active FePO4 Coating by Atomic Layer Deposition for Increased High-Voltage Stability of LiNi0.5Mn1 O4 Cathode Material," Advanced Science, May 2015, vol. 2, No. 5, 1500022, 6 pages.
Xiao, "Atomic Layer Coating to Mitigate Capacity Fading Associated with Manganese Dissolution in Lithium Ion Batteries," Electrochemistry Communications, Jul. 2013, vol. 32, pp. 31-34.
Xing et al., "High Performance LiNi0.5Mn1.5O4 Spinel Li-ion Battery Cathode Development," The Electrochemical Society, ECS Transations, 2013, 53(30), pp. 111-119, 9 pages.
Xing, "Atomic Layer Deposition of Metal Oxides on Activated Carbons for High Energy Density and High Performance Supercapacitors," was submitted to 227th Electrochemical Society Meeting on Nov. 30, 2014, 2 pages.
Yesibolati et al., "SnO2 Anode Surface Passivation by Atomic Layer Deposited HfO2 Improves Li-Ion Battery Performance," Small, Jul. 2014, vol. 10, No. 14, pp. 2849-2858 (Abstract Only).
Yongli et al., "Electrochemical Performance Ni Doped Spinel LiMn2O4 Cathode for Lithium Ion Batteries," Adv. Materials Res., doi:10.4028/www.scientific.net/AMR.347-353.290, 2012, 12 pages.
Zhang et al., "Electrochemical characteristic and discharge mechanism of a primary Li/CFx cell," Journal of Power Sources, 2009, vol. 187(1), pp. 233-237, 1 page, abstract only.
Zhang et al., "Preparation, Characterization and Electrochemical Catalytic Properties of Hallandite Ag2Mn8O16 for Li-Air Batteries," Journal of the Electrochemical Society, 2012, vol. 159(3), pp. A310-A314.
Zhao et al., "Atomic layer deposition of epitaxial ZrO2 coating on LiMn2O4 nanoparticles for high-rate lithium ion batteries at elevated temperature," Nano Energy, Sep. 2013, vol. 2, No. 5, pp. 882-889.
Zheng et al, "Mitigating Voltage Fade in Cathode Materials by Improving the Atonic Level Uniformity of Elemental Distribution," Nano Letters, Apr. 2014, vol. 14, No. 5, pp. 2628-2635.
Zhong, "Lithium-Air Batteries: An Overview," Submitted as coursework for PH240, Stanford University, Dec. 3, 2011, 4 pages.
Zhou et al., "LiNi0.5Mn1.5O4 Hollow Structures as High-Performance Cathodes for Lithium-Ion Batteries," Angew. Chem. Int. Ed., 2012, vol. 51, pp. 239-241.
International Search Report and Written Opinion for International (PCT) Patent Application No. PCT/US2016/044843, dated Oct. 21, 2016, 16 pages.
International Preliminary Report on Patentability for International (PCT) Patent Application No. PCT/US2016/044843, dated Feb. 15, 2018, 16 pages.
Official Action for U.S. Appl. No. 14/175,873, dated Oct. 7, 2015, 7 pages.
Final Action for U.S. Appl. No. 14/175,873, dated May 5, 2016, 6 pages.
Notice of Allowance for U.S. Appl. No. 14/175,873, dated Nov. 21, 2016, 8 pages.

(56) References Cited

OTHER PUBLICATIONS

Restriction Requirement for U.S. Appl. No. 14/606,932, dated Apr. 20, 2016, 7 pages.
Official Action for U.S. Appl. No. 14/606,932, dated Jul. 1, 2016, 22 pages.
Official Action for U.S. Appl. No. 14/606,932, dated Mar. 16, 2017, 15 pages.
Notice of Allowance for U.S. Appl. No. 14/606,932, dated Sep. 21, 2017, 11 pages.
Official Action for U.S. Appl. No. 14/802,805, dated Dec. 15, 2016, 8 pages.
Notice of Allowance for U.S. Appl. No. 14/802,805, dated Apr. 25, 2017, 7 pages.
Official Action for U.S. Appl. No. 15/162,234, dated Nov. 8, 2017, 12 pages.
Final Action for U.S. Appl. No. 15/162,234, dated Jun. 21, 2018, 7 pages.
Final Action for U.S. Appl. No. 15/660,772, dated Aug. 24, 2018, 7 pages.
Official Action for U.S. Appl. No. 15/679,979, dated Jan. 30, 2019, 5 pages, Restriction Requirement.
Official Action for U.S. Appl. No. 15/679,979, dated Apr. 4, 2019, 8 pages.
Final Action for U.S. Appl. No. 15/660,772, dated Feb, 15, 2019, 15 pages.
Official Action for U.S. Appl. No. 15/821,092, dated Feb. 11, 2019, 8 pages, Restriction Requirement.
Notice of Allowance for U.S. Appl. No. 15/162,234, dated Oct. 4, 2018, 7 pages.
U.S. Appl. No. 16/738,990, filed Jan. 9, 2020, Xing.
U.S. Appl. No. 16/654,911, filed Oct. 16, 2019, Cordova.
U.S. Appl. No. 16/655,947, filed Oct. 17, 2019, Cordova.
Park et al., "Ultrathin Lithium-Ion Conducting Coatings for Increased Interfacial Stability in High Voltage Lithium-Ion Batteries," Chem. Mater., 2014, vol. 26, pp. 3128-3134.
Third Party Submission for U.S. Appl. No. 15/679,979, dated Jun. 26, 2018, 14 pages.
Final Action for U.S. Appl. No. 15/821,092, dated Dec. 27, 2019, 20 pages.
Miller et al., "The mechanical robustness of atomic-layer and molecular-layer deposited coatings on polymer substrates," Journal of Applied Physics, 2009, vol. 105, pp. 093527-1-093527-12.
Notice of Allowance for U.S. Appl. No. 15/679,979, dated Sep. 30, 2019, 8 pages.
Official Action for U.S. Appl. No. 15/821,092, dated Jul. 16, 2019, 16 pages.

\* cited by examiner

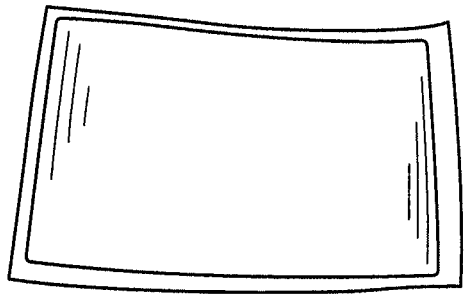
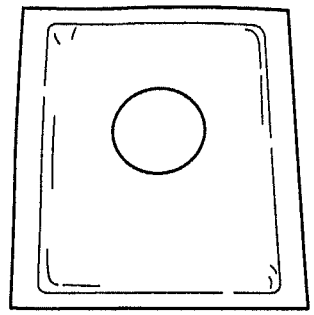
FIG.6A  FIG.6B
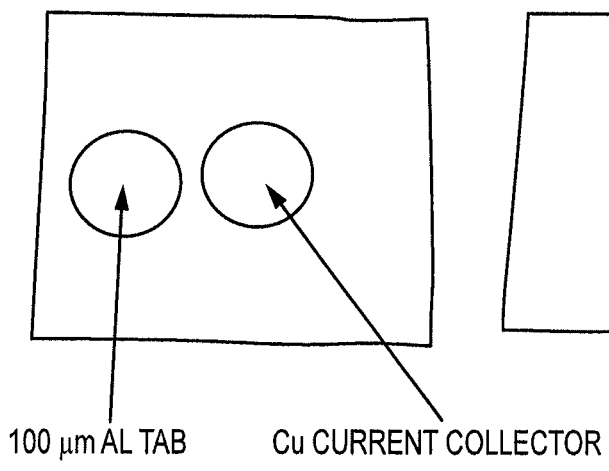
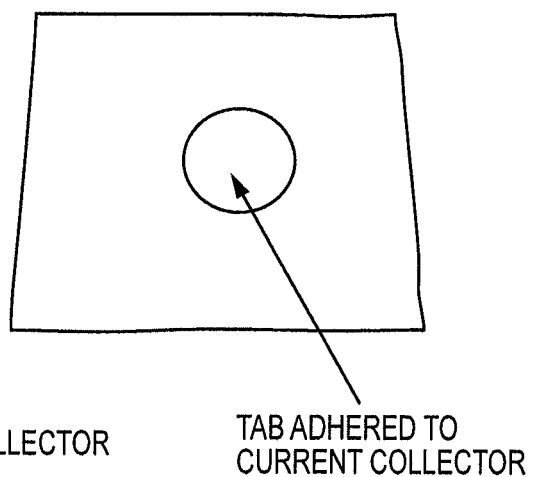
100 μm AL TAB   Cu CURRENT COLLECTOR   TAB ADHERED TO CURRENT COLLECTOR
FIG.7A  FIG.7B

ELECTROCHEMICAL PERFORMANCE OF THREE-CELL STACK

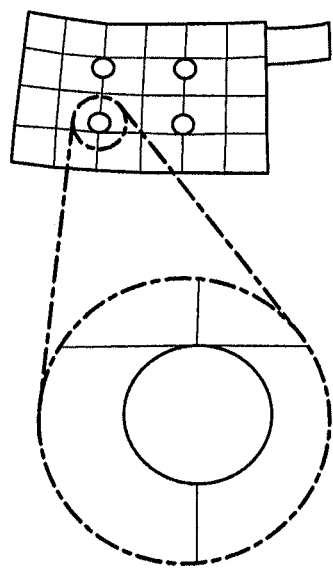
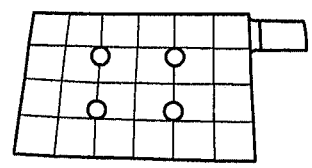
FIG.11B
FIG.11A

DISCHARGE OF PRIMED CELL (BLUE): Li-Si-C/$V_2O_5$ COMPOSITE.
A Li//$V_2O_5$ CELL IS SHOWN AS A REFERENCE (RED)

HIGH ENERGY AND POWER ELECTROCHEMICAL DEVICE AND METHOD OF MAKING AND USING SAME

CROSS REFERENCE TO RELATED APPLICATIONS

The present application claims priority under 35 U.S.C. § 119 to U.S. Provisional Patent Application No. 62/199,640, which was filed Jul. 31, 2015, entitled "High Energy Power Chemical Reserve Battery and Method of Making and Using the Same," which is incorporated in its entirety herein by this reference.

STATEMENT REGARDING FEDERALLY SPONSORED RESEARCH OR DEVELOPMENT

The invention was made with Government support under Contract No. N68936-14-C-0097 awarded by the United States Navy. The Government has certain rights in the invention.

BACKGROUND

A reserve battery is a primary or secondary battery in which part is isolated until the battery needs to be used. When a long storage period is required, reserve batteries are often used, since the active chemicals of the cell are segregated or exist in an inactive state until needed, thereby reducing self-discharge. Common types of reserve batteries include aluminum batteries, silver-zinc batteries, thermal batteries, and water-activated batteries.

Liquid reserve batteries typically require a substantial activation time due to the time required for the electrolyte to penetrate and effectively contact the electrodes, even when the electrolyte is introduced into the battery under pressure.

SUMMARY

These and other needs are addressed by the present disclosure. Aspects of the present disclosure can have advantages over current practices. A number of variations and modifications of the disclosure can be used. It would be possible to provide for some features of the disclosure without providing others.

An electrochemical device electrode can include a plurality of corrugation features comprising a first corrugation feature to pass an electrolyte through the corrugation electrode and a second corrugation feature in fluid communication with the first corrugation feature to contact the electrolyte across a portion of an active surface of the electrode.

An electrochemical device can include:
an electrolyte;
an anode;
a cathode; and
an ion permeable separator positioned between the anode and cathode.

One or both of the anode and cathode can comprise a plurality of corrugation features comprising a first corrugation feature to pass an electrolyte through the corresponding anode or cathode and a second corrugation feature in fluid communication with the first corrugation feature to contact the electrolyte across a portion of an active surface of the corresponding anode or cathode.

An electrochemical device can include:
an electrolyte;
an anode;
a cathode; and
an ion permeable separator positioned between the anode and cathode, wherein the ion separator comprises a plurality of passages extending through the separator to enable the electrolyte to flow freely through the ion permeable separator.

An electrolyte can be introduced into an electrochemical device and passed, via a first corrugation feature, through a first electrode of the electrochemical device. The liquid electrolyte can be passed through perforations, voids, apertures, cavities and holes in an ion permeable, semi-permeable or impermeable separator or through the ion permeable or semi-permeable separator in the absence of a perforation, void, aperture, cavity or hole and contacted with a second electrode. The first or second electrode comprises a second corrugation feature in fluid communication with the first corrugation feature to contact the electrolyte across a portion of an active surface of the first or second electrode.

The first corrugation feature can include one or more perforations, voids, apertures, cavities and holes and the second corrugation feature plural channels and/or grooves extending outwardly from the first corrugation feature.

The sizes of the first and second corrugation features can be more than about 50 nm in any dimension.

The depth of the first corrugation feature can be a thickness of the electrode.

The perforations, voids, apertures, cavities and holes (hereinafter referred to as a passage) in the ion permeable separator can have a depth that is the thickness of the separator.

The electrochemical device can be an energy storage device, such as a battery, supercapacitor or capacitor.

At least about 0.1% of the active surface can comprise or be part of the first and/or second corrugation feature.

At least about 1% of the active surface can comprise or be part of the first and/or second corrugation feature.

At least about 10% of the active surface can comprise or be part of the first and/or second corrugation feature.

No more than about 40% of the active surface can comprise or the part of the first and/or second corrugation feature No more than about 45% of the active surface can comprise or be part of the first and/or second corrugation feature No more than about 50% of the active surface can comprise or be part of the first and/or second corrugation feature.

The first and second corrugation features can be formed by one or more of a machining process, chemical deposition, physical deposition, masking, and etching.

The second corrugation feature can comprise plural channels and/or grooves extending outwardly from the first corrugation feature.

The plural channels and/or grooves can define a pattern.

The pattern can be a grid comprising first channels and/or grooves substantially parallel to one another and second channels and/or grooves substantially parallel to one another. The first channels and/or grooves can be transverse to and intersect the second channels and/or grooves.

The pattern can be plural channels and/or grooves extending radially outwardly from the first corrugation feature.

The electrode can comprise one or more of carbon, an alkali metal, an alkaline earth metal, and a transition metal. The electrode can comprise lithium.

The first corrugation feature can have a width of at least about 20 microns.

The first corrugation feature can have a width of at least about 50 microns.

The second corrugation feature can have an average, mean and/or mode width or depth of at least about 5 microns.

The second corrugation feature can have an average, mean and/or mode width or depth of at least about 10 microns.

The second corrugation feature can have an average, mean and/or mode width or depth of at least about 15 microns.

Multiple electrodes can be stacked one-above-the-other or wrapped one-about-the-other. Each of the multiple electrodes can comprise first and second corrugation features. An ion permeable separator can be positioned between each pair of adjacent electrodes with passages that align with the first corrugation feature. The first corrugation features of the various electrodes can be aligned relative to one another and the passage to define an electrolyte flow pathway for the electrolyte through the multiple electrodes.

The second corrugation feature can have an average width that when the network of orientated channels and/or grooves are contacted with an electrolyte the electrolyte flows and wets the active surface in no more than about one second.

The first corrugation feature and separator passage can have an average diameter that when the pattern of perforations, voids, holes, apertures, cavities, and/or voids are contacted with an electrolyte the electrolyte flows and wets the active surface in no more than about one second.

The interconnected network of first and second corrugation features can provide a reserve battery requiring little activation time due to the rapid penetration and distribution of the electrolyte throughout the active surfaces of the stacked or wrapped electrodes. This accelerated activation and/or wetting of the tightly packed electrodes can be highly beneficial in many other electrochemical systems.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 6A depicts an aluminum tab and a copper current collector according to some embodiment of the present disclosure;

FIG. 6B depicts an aluminum tab and a copper current collector according to some embodiment of the present disclosure;

FIG. 7A depicts a laminated electrochemical sub-cell according to some embodiments of the present disclosure;

FIG. 7B depicts a laminated electrochemical sub-cell according to some embodiments of the present disclosure;

FIG. 11A depicts a laser-ablated corrugated cathode showing the channels and/or grooves according to some embodiments of the present disclosure;

FIG. 11B depicts a laser-ablated corrugated anode according to some embodiments of the present disclosure;

DETAILED DESCRIPTION

Figure 1:
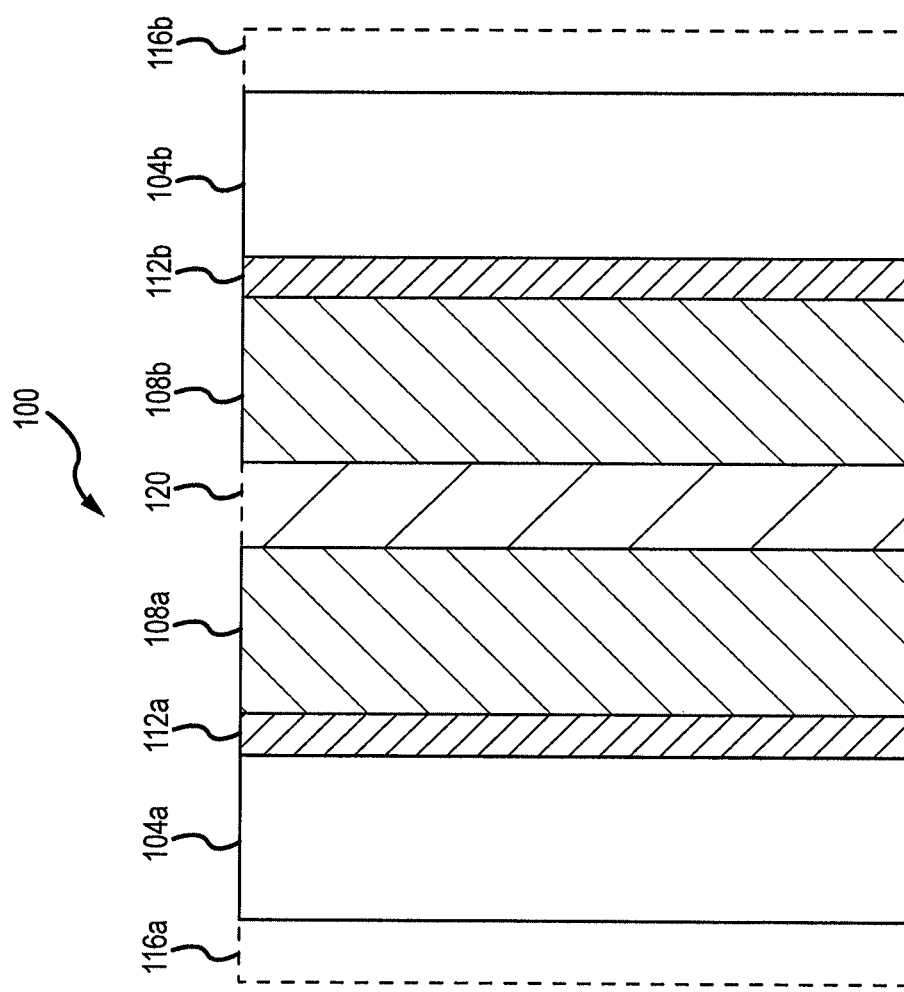
FIG. 1 depicts an electrochemical component according to some embodiments of the present disclosure.

Some embodiments of the present disclosure relate to an electrochemical system and/or device design architectures and methods of making those architectures. Some of those embodiments include electrochemical cell designs having one or more electrodes. FIG. 1, for example, depicts an electrochemical component according to the present disclosure. The electrochemical component 100 comprises first and second oppositely polarized electrode 104a and b, an electrolyte 108a and b, a corrugated surface 112a and b adjacent to each of the first and second electrodes 104a and b, respectively, and the corresponding electrolyte 108a and b, an optional current collector 116a and b in electrical communication with each of the first and second electrodes 104a and b, respectively, and an optional separator (or ion-permeable membrane) 120 interposed between the corrugated surfaces 112a and b and electrolyte 108a and b. An electrode and its corresponding current collector 116 and/or corrugated surface can be integral or separate from one another. The electrochemical component 100 can be a cathode or anode in an electrochemical energy storage device, such as a capacitor, supercapacitor or ultracapacitor or electric double-layer capacitor, battery, and the like.

The corrugated surface 112 can have one or more of perforations, voids, apertures, cavities, holes, passages, channels, and/or grooves (individually or collectively a "corrugation feature"), and an ion (permeable, semi-permeable, or impermeable) separator between the electrodes can have one or more of perforations, voids, apertures, cavities, holes, passages, channels, and/or grooves (individually or collectively a "passage"). The corrugation features of the corrugated surface 112 are typically positioned on one or more surfaces of the one or more electrodes. Generally, the corrugation feature can be configured in the form of an interconnected network of corrugation features. While not wishing to be bound by any theory, it is believed that the network of interconnected corrugation features can rapidly infuse an electrolyte throughout an electrode surface and separator due to the network of corrugation features. While the average, median, or mode size (e.g., dimension (such as diameter or width and/or height) of the corrugation features and/or passages can vary depending on the application, the average, median, or mode size(s) typically are larger than a micro-structure (e.g., larger than about 2 nm in any dimension). One or more of the average, median, or mode size(s) typically can be a meso-structure (e.g., in the range of from about 2 nm to about 50 nm). One or more of the average, median, or mode size(s) can be larger than a meso-structure (e.g., larger than 50 nm). In many applications, the average, median, or mode size(s) of the corrugation features and/or passages is/are at least about 50 nm in any dimension. In many applications, the average, median, or mode size(s) of the corrugation features and/or passages is/are at least about 1 μm in any dimension. In many applications, the average, median, or mode size(s) of the corrugation features and/or passages is/are at least about 5 μm in any dimension. In many applications, the average, median, or mode size(s) of the corrugation features and/or passages is/are at least about 10 μm in any dimension. Electrodes having the corrugated surface comprising one or more corrugation features can also be referred to as corrugated electrodes.

The corrugated surface can have any pattern of corrugation features that provide more electrode contact surface area with the electrolyte. Patterns can include perforations, voids, apertures, cavities, and/or holes transverse to the electrolyte-contacting face of the surface, grooves or channels substantially parallel to the electrolyte-contacting face of the surface, and combinations thereof. Exemplary patterns include grooves or channels in a waffle-type pattern, channels radially diverging from cavities, cross-thatch pattern cavities or apertures via laser-ablated holes, and combinations thereof.

The corrugated surface 112 can be formed by many techniques. For example, a laser ablation process can produce the corrugation features on the one or more electrodes. The laser ablation process can also be referred to as a machining process. The corrugated surface can be deposited as patterned thin film layers using a thin film technique such as chemical and/or physical deposition using masks and/or etchants to yield a layer having a desired pattern. As will be appreciated, an etchant reactive mask can be applied to the electrode surface before deposition and later removed by etching to weaken the overlying deposited material or an etchant resistant mask can be applied to the corrugated surface after deposition and the unmasked areas removed by the etchant to yield the desired pattern. Alternatively, the desired pattern can be yield by selective deposition of the thin film of the corrugated surface in selected (target) areas of the electrode surface to yield the desired pattern.

The corrugated surface 112 can have the same or different chemical composition compared to the electrode 104 and be deposited, formed, or otherwise applied concurrently or sequentially with the electrode 104 material. The corrugated surface 112 can not only be separate from but also integral with the electrode 104. Typically, the corrugated surface is formed from a material having an electrical conductivity at least as high as that of the electrode 104 and optional current collector 116 to enable free flow of electrons through the corrugated electrode and avoid collection of the current in the optional current collector 116 and electrode 104.

A capacitor using the corrugated surface 112 is typically a passive two-terminal electrical component used to store electrical energy temporarily in an electric field. The forms of practical capacitors vary widely, but all contain at least two electrical conductors (plates) (one or both of which can be a corrugated electrode) separated by a dielectric (i.e. an insulator that can store energy by becoming polarized). The conductors can be thin films, foils or sintered beads of metal or conductive electrolyte, etc. The non-conducting dielectric acts to increase the capacitor's charge capacity. Materials commonly used as dielectrics include glass, ceramic, plastic film, air, vacuum, paper, mica, and oxide layers. A capacitor stores energy in the form of an electrostatic field between its plates.

A supercapacitor employing the corrugated surface 112 does not use the conventional solid dielectric of ordinary capacitors but rather uses electrostatic double-layer capacitance, electrochemical pseudocapacitance, or a combination of both. An exemplary electrostatic double-layer supercapacitor comprises positively and negatively charged electrochemical components 100, each comprising a polarized collector 116, electrode 104, Helmholtz double layer (not shown), and electrolyte 108 having positive and negatively charged ions, and a common separator 120 separating the oppositely charged electrochemical components. The separation of charge is commonly of the order of a few ångstroms (0.3-0.8 nm), which is generally much smaller than in a conventional capacitor.

One or more of the electrochemical components 100 comprises a corrugated electrode. The electrostatic double-layer capacitor typically uses carbon electrodes or derivatives thereof with much higher electrostatic double-layer capacitance than electrochemical pseudocapacitance, achieving separation of charge in the Helmholtz double layer at the interface between the surface of the conductive electrode and electrolyte. The most commonly used electrode material for such supercapacitors is one or more of activated carbon (AC), carbon fibre-cloth (AFC), carbide-derived carbon (CDC), carbon aerogel, graphite (graphene), graphene and carbon nanotubes (CNTs). Pore sizes in carbons typically range from micropores (less than 2 nm) to mesopores (2-50 nm), but only micropores (<2 nm) contribute to pseudocapacitance. The separation of charge is of the order of a few ångstroms (0.3-0.8 nm), which is generally much smaller than in a conventional capacitor. Another type of supercapacitors includes electrochemical pseudocapacitors employing metal oxide (e.g., transition metal oxides) or conducting polymer electrodes with a high amount of electrochemical pseudocapacitance. Oxides of transition metals including ruthenium ($RuO_2$), iridium ($IrO_2$), iron ($Fe_3O_4$), manganese ($MnO_2$) or sulfides such as titanium sulfide ($TiS_2$) alone or in combination generate strong faradaic electron-transferring reactions combined with low resistance. Conducting polymers include polyaniline, polythiophene, polypyrrole and polyacetylene. Some supercapacitors include one or more of $MnO_2$ or a conducting polymer to form the second electrode (e.g., the cathode or positive electrode). Such electrodes can employ electrochemical doping or dedoping of the polymers with anions and cations. Pseudocapacitance is commonly achieved by Faradaic electron charge-transfer with redox reactions, intercalation or electrosorption, Yet another type of supercapacitor includes hybrid capacitors, such as the lithium-ion capacitor, that uses electrodes with differing characteristics, generally one of which exhibits mostly electrostatic capacitance and the other mostly electrochemical capacitance. Composite electrodes for hybrid-type supercapacitors are constructed from carbon-based material with incorporated or deposited pseudocapacitive active materials like metal oxides and conducting polymers. Carbon nanotubes can provide a backbone for a homogeneous distribution of metal oxide or electrically conducting polymers (ECPs), producing good pseudocapacitance and good double-layer capacitance. Carbon nanotube electrodes can be doped with a pseudocapacitive dopant as in lithium-ion capacitors.

Supercapacitor corrugated electrodes are generally thin coatings applied and electrically connected to a conductive, metallic current collector. In supercapacitors generally, the electrolyte forms an ionic conductive connection between the oppositely charged electrodes, one or both of which can be corrugated electrodes. Typical electrolytes include a solvent and dissolved chemicals that dissociate into positive cations and negative anions, making the electrolyte electrically conductive. Aqueous electrolytes are commonly treated with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$). Electrolytes can be based on organic solvents, such as acetonitrile, propylene carbonate, tetrahydrofuran, diethyl carbonate, γ-butyrolactone and solutions with quaternaryammonium salts or alkyl ammonium salts such as tetraethylammonium tetrafluoroborate ($N(Et)_4BF_4$) or triethyl (metyl) tetrafluoroborate ($NMe(Et)_3BF_4$). Separators physically separate the two corrugated electrodes to prevent a short circuit by direct contact. Separators can be very thin (a few hundredths of a millimeter) and very porous to the conducting ions to minimize electrostatic resistance. Separators are commonly chemically inert to protect the electrolyte's stability and conductivity. Separators can be, for example, open capacitor papers, nonwoven porous polymeric films like polyacrylonitrile or Kapton, woven glass fibers or porous woven ceramic fibres. Supercapacitors are typically polarized by design with asymmetric corrugated electrodes, or, for symmetric corrugated electrodes, by a potential applied during manufacture. As will be appreciated, supercapacitors can be wound or stacked in construction.

A battery comprises an electrochemical cell having plural corrugated electrodes with external connections provided to power electrical devices. When a battery is supplying power, its positive terminal is the cathode and its negative terminal is the anode. A battery can include plural pairs of oppositely charged electrodes with the number of pairs being related to the energy storage capacity of the battery. With reference to FIG. 1, the electrochemical device 100 includes the first and second electrodes 104a and b, connected in series by the conductive electrolyte 108 containing anions and cations. Each polarized first and second electrode 104 has only one facing corrugated surface 112, while the other electrode surface is conventional or non-corrugated. In stacked or wrapped electrodes, the interior electrodes can have opposing corrugated surfaces to interact with an oppositely polarized electrode on either of its sides. The adjacent oppositely charged electrodes are electrically connected by one or more electrolytes 108 and separated by the separator 120. A current collector 116 can be part of the electrode depending on electrode location in the battery. As will be appreciated, one oppositely charged electrode pair includes the negative, optionally corrugated, electrode, or the electrode to which anions (negatively charged ions) migrate, and the other electrode in the pair includes the positive, optionally corrugated, electrode to which cations (positively charged ions) migrate. Redox reactions power the battery. Cations are reduced (e.g., electrons are added) at the cathode during charging, while anions are oxidized (e.g., electrons are removed) at the anode during charging. During discharge, the process is reversed. The electrodes do not physically touch each other, but are electrically connected by the electrolyte. Some cells use different electrolytes for each electrolyte 108a and 108b. The separator can allow ions to flow between opposing electrodes but prevent mixing of the electrolytes.

The battery can be a primary battery, that irreversibly transforms chemical energy to electrical energy or a secondary battery that can be recharged, or have its chemical reaction substantially reversed, by supplying electrical energy to the cell. The battery can be a wet cell, or using a liquid electrolyte, or a dry cell, or using a paste electrolyte with sufficient moisture to enable the current to flow. The battery can be a reserve battery that is stored unassembled (e.g., unactivated and supplying no power) for a long period (e.g., years), and, when the battery is needed, it can be assembled by adding electrolyte and charged and ready to supply electrical energy. For example, a battery can be activated by impact, such as a wreck of a vehicle or air plane or other type of impact: The acceleration breaks a capsule of electrolyte that activates the battery.

The corrugated surface of the present disclosure can be employed in many types of electrochemical systems including galvanic cells, electrolytic cells, fuel cells, flow cells, and voltaic piles. The corrugated surface can be beneficial in primary, secondary or reserve battery chemistry including without limitation primary batteries such as zinc-carbon, zinc-chloride, alkaline (e.g., zinc manganese dioxide), nickel oxyhydroxide (e.g., zinc-manganese dioxide/nickel oxyhydroxide), lithium (e.g., lithium-copper oxide or Li—CuO, lithium-iron disulfide or $LiFeS_2$, lithium-manganese dioxide or $LiMnO_2$, lithium-carbon fluoride or Li—$(CF)_n$, and lithium-chromium oxide or Li—$CrO_2$), mercury oxide, zinc-air, Zamboni pile, silver oxide (silver-zinc), and magnesium and secondary batteries such as NiCd, lead-acid, NiMH, NiZn, AgZn, and lithium ion. Particular benefits can be derived from using the corrugated surface in solid state wet batteries.

While the corrugated surface is discussed with specific reference to electrochemical energy reserve systems and/or devices in the form of chemical reserve batteries, it is to be understood that the teachings of this disclosure apply to many different types of electrochemical components, including those discussed above.

The corrugated electrode can address current reserve battery shortcomings and alternatives to them. A lithium-based, chemical reserve battery is a non-limiting example of an electrochemical energy reserve system and/or device. The chemical reserve batteries using one or more corrugated electrodes can have tremendous potential to supplant currently utilized thermal, reserve batteries and alternative chemical reserve batteries that implement a liquid-based cathode. Moreover, the chemical reserve batteries using one or more corrugated electrodes can offer up to more than ten times more energy, power, or combination thereof than conventional thermal reserve batteries. While not wishing to be bound by any theory, the increase in one or more of the energy and power of the chemical reserve batteries described herein is believed to be due to the utilization of the one or more high energy and power density of lithium based battery electrochemistry. The use of solid-state, thin-film electrodes with a network of channels and cavities can permit the rapid infusion of electrolyte leading to rapid activation and rise times (projected milliseconds) independent of battery size. This disclosure is particularly beneficial to solid-state cathodes, rather than liquid based cathodes such as, Lithium sulfur dioxide (Li—$SO_2$), Lithium thionyl chloride (Li—$SOCl_2$) or Lithium sulfuryl chloride (Li—$SO_2Cl_2$) that can pose serious operational and safety concerns. Moreover, some embodiments of the present disclosure relate to chemical reserve batteries and methods of making those batteries.

In accordance with some embodiments of the present disclosure, the electrochemical system design can include a hermetically sealed, laminated, bipolar, electrochemical battery configuration. The hermetically sealed, laminated, bipolar, electrochemical battery can be stored in a galvanic state capable of providing electrical current once activated with electrolyte. The ability to assemble the hermetically sealed, laminated, bipolar, electrochemical battery in a galvanic state without an electrolyte can achieve a shelf life of the electrochemical battery of about 30 years or more. The ability to assemble the hermetically sealed, laminated, bipolar, electrochemical battery in a galvanic state without an electrolyte can achieve a shelf life of the electrochemical battery of about 29 years or more. The ability to assemble the hermetically sealed, laminated, bipolar, electrochemical battery in a galvanic state without an electrolyte can achieve a shelf life of the electrochemical battery of about 28 years or more. The ability to assemble the hermetically sealed, laminated, bipolar, electrochemical battery in a galvanic state without an electrolyte can achieve a shelf life of the electrochemical battery of about 27 years or more. The ability to assemble the hermetically sealed, laminated, bipolar, electrochemical battery in a galvanic state without an electrolyte can achieve a shelf life of the electrochemical battery of about 26 years or more. The ability to assemble the hermetically sealed, laminated, bipolar, electrochemical battery in a galvanic state without an electrolyte can achieve a shelf life of the electrochemical battery of about 25 years or more. The ability to assemble the hermetically sealed, laminated, bipolar, electrochemical battery in a galvanic state without an electrolyte can achieve a shelf life of the electrochemical battery of about 24 years or more. The ability to assemble the hermetically sealed, laminated, bipolar, electrochemical battery in a galvanic state without an electrolyte can achieve a shelf life of the electrochemical battery of about 23 years or more. The ability to assemble the hermetically sealed, laminated, bipolar, electrochemical battery in a galvanic state without an electrolyte can achieve a shelf life of the electrochemical battery of about 22 years or more. The ability to assemble the hermetically sealed, laminated, bipolar, electrochemical battery in a galvanic state without an electrolyte can achieve a shelf life of the electrochemical battery of about 21 years or more. The ability to assemble the hermetically sealed, laminated, bipolar, electrochemical battery in a galvanic state without an electrolyte can achieve a shelf life of the electrochemical battery of about 20 years or more. The ability to assemble the hermetically sealed, laminated, bipolar, electrochemical battery in a galvanic state without an electrolyte can achieve a shelf life of the electrochemical battery of about 19 years or more. The ability to assemble the hermetically sealed, laminated, bipolar, electrochemical battery in a galvanic state without an electrolyte can achieve a shelf life of the electrochemical battery of about 18 years or more. The ability to assemble the hermetically sealed, laminated, bipolar, electrochemical battery in a galvanic state without an electrolyte can achieve a shelf life of the electrochemical battery of about 17 years or more. The ability to assemble the hermetically sealed, laminated, bipolar, electrochemical battery in a galvanic state without an electrolyte can achieve a shelf life of the electrochemical battery of about 16 years or more. The ability to assemble the hermetically sealed, laminated, bipolar, electrochemical battery in a galvanic state without an electrolyte can achieve a shelf life of the electrochemical battery of about 15 years or more. The ability to assemble the hermetically sealed, laminated, bipolar, electrochemical battery in a galvanic state without an electrolyte can achieve a shelf life of the electrochemical battery of about 14 years or more. The ability to assemble the hermetically sealed, laminated, bipolar, electrochemical battery in a galvanic state without an electrolyte can achieve a shelf life of the electrochemical battery of about 13 years or more. The ability to assemble the hermetically sealed, laminated, bipolar, electrochemical battery in a galvanic state without an electrolyte can achieve a shelf life of the electrochemical battery of about 12 years or more. The ability to assemble the hermetically sealed, laminated, bipolar, electrochemical battery in a galvanic state without an electrolyte can achieve a shelf life of the electrochemical battery of about 11 years or more. The ability to assemble the hermetically sealed, laminated, bipolar, electrochemical battery in a galvanic state without an electrolyte can achieve a shelf life of the electrochemical battery of about 10 years or more. The ability to assemble the hermetically sealed, laminated, bipolar, electrochemical battery in a galvanic state without an electrolyte can achieve a shelf life of the electrochemical battery of about 9 years or more. The ability to assemble the hermetically sealed, laminated, bipolar, electrochemical battery in a galvanic state without an electrolyte can achieve a shelf life of the electrochemical battery of about 8 years or more. The ability to assemble the hermetically sealed, laminated, bipolar, electrochemical battery in a galvanic state without an electrolyte can achieve a shelf life of the electrochemical battery of about 7 years or more. The ability to assemble the hermetically sealed, laminated, bipolar, electrochemical battery in a galvanic state without an electrolyte can achieve a shelf life of the electrochemical battery of about 6 years or more. The ability to assemble the hermetically sealed, laminated, bipolar, electrochemical battery in a galvanic state without an electrolyte can achieve a shelf life of the electrochemical battery of about 5 years or more. Moreover, the ability to assemble the hermetically sealed, laminated, bipolar, electrochemical battery in a galvanic state without an electrolyte can achieve a shelf life of the electrochemical system of at least about from 5 to about 30 years. The ability to assemble the hermetically sealed, laminated, bipolar, electrochemical battery in a galvanic state without an electrolyte can achieve a shelf life of the electrochemical battery of at least about form 5 to about 29 years. The ability to assemble the hermetically sealed, laminated, bipolar, electrochemical battery in a galvanic state without an electrolyte can achieve a shelf life of the electrochemical battery of at least about form 5 to about 28 years. The ability to assemble the hermetically sealed, laminated, bipolar, electrochemical battery in a galvanic state without an electrolyte can achieve a shelf life of the electrochemical battery of at least about form 5 to about 27 years. The ability to assemble the hermetically sealed, laminated, bipolar, electrochemical battery in a galvanic state without an electrolyte can achieve a shelf life of the electrochemical battery of at least about form 5 to about 26 years. The ability to assemble the hermetically sealed, laminated, bipolar, electrochemical battery in a galvanic state without an electrolyte can achieve a shelf life of the electrochemical battery of at least about form 5 to about 25 years. The ability to assemble the hermetically sealed, laminated, bipolar, electrochemical battery in a galvanic state without an electrolyte can achieve a shelf life of the electrochemical battery of at least about form 5 to about 24 years. The ability to assemble the hermetically sealed, laminated, bipolar, electrochemical battery in a galvanic state without an electrolyte can achieve a shelf life of the electrochemical battery of at least about form 5 to about 23 years. The ability to assemble the hermetically sealed, laminated, bipolar, electrochemical battery in a galvanic state without an electrolyte can achieve a shelf life of the electrochemical battery of at least about form 5 to about 22 years. The ability to assemble the hermetically sealed, laminated, bipolar, electrochemical battery in a galvanic state without an electrolyte can achieve a shelf life of the electrochemical battery of at least about form 5 to about 21 years. The ability to assemble the hermetically sealed, laminated, bipolar, electrochemical battery in a galvanic state without an electrolyte can achieve a shelf life of the electrochemical battery of at least about form 5 to about 20 years. The ability to assemble the hermetically sealed, laminated, bipolar, electrochemical battery in a galvanic state without an electrolyte can achieve a shelf life of the electrochemical battery of at least about form 5 to about 19 years. The ability to assemble the hermetically sealed, laminated, bipolar, electrochemical battery in a galvanic state without an electrolyte can achieve a shelf life of the electrochemical battery of at least about form 5 to about 18 years. The ability to assemble the hermetically sealed, laminated, bipolar, electrochemical battery in a galvanic state without an electrolyte can achieve a shelf life of the electrochemical battery of at least about form 5 to about 17 years. The ability to assemble the hermetically sealed, laminated, bipolar, electrochemical battery in a galvanic state without an electrolyte can achieve a shelf life of the electrochemical battery of at least about form 5 to about 16 years. The ability to assemble the hermetically sealed, laminated, bipolar, electrochemical battery in a galvanic state without an electrolyte can achieve a shelf life of the electrochemical battery of at least about form 5 to about 15 years. The ability to assemble the hermetically sealed, laminated, bipolar, electrochemical battery in a galvanic state without an electrolyte can achieve a shelf life of the electrochemical battery of at least about form 5 to about 14 years. The ability to assemble the hermetically sealed, laminated, bipolar, electrochemical battery in a galvanic state without an electrolyte can achieve a shelf life of the electrochemical battery of at least about form 5 to about 13 years. The ability to assemble the hermetically sealed, laminated, bipolar, electrochemical battery in a galvanic state without an electrolyte can achieve a shelf life of the electrochemical battery of at least about form 5 to about 12 years. The ability to assemble the hermetically sealed, laminated, bipolar, electrochemical battery in a galvanic state without an electrolyte can achieve a shelf life of the electrochemical battery of at least about form 5 to about 11 years. The ability to assemble the hermetically sealed, laminated, bipolar, electrochemical battery in a galvanic state without an electrolyte can achieve a shelf life of the electrochemical battery of at least about form 5 to about 10 years. The ability to assemble the hermetically sealed, laminated, bipolar, electrochemical battery in a galvanic state without an electrolyte can achieve a shelf life of the electrochemical battery of at least about form 5 to about 9 years. The ability to assemble the hermetically sealed, laminated, bipolar, electrochemical battery in a galvanic state without an electrolyte can achieve a shelf life of the electrochemical battery of at least about form 5 to about 8 years. The ability to assemble the hermetically sealed, laminated, bipolar, electrochemical battery in a galvanic state without an electrolyte can achieve a shelf life of the electrochemical battery of at least about form 5 to about 7 years. The ability to assemble the hermetically sealed, laminated, bipolar, electrochemical battery in a galvanic state without an electrolyte can achieve a shelf life of the electrochemical battery of at least about form 5 to about 6 years.

While not wishing to be bound by any theory, it is believed that the rapid infusion and/or diffusion of the electrolyte throughout the corrugated electrode surface and inter-electrode spaces can decrease activation time for the chemical reserve battery using one or more corrugated electrodes. For example, the rapid infusion and/or diffusion of the electrolyte throughout the corrugated electrode surface and inter-electrode spaces and optional ion separator passages are believed to decrease activation time for an electrochemical system and/or battery. The corrugation features and optional ion separator passages can rapidly infuse and/or diffuse an electrolyte throughout an electrode surface and inter-electrode spaces in no more than about five seconds. The corrugation features and optional ion separator passages can rapidly infuse and/or diffuse an electrolyte throughout an electrode surface and inter-electrode spaces in typically no more than about four seconds. The corrugation features and optional ion separator passages can rapidly infuse and/or diffuse an electrolyte throughout an electrode surface and inter-electrode spaces in typically no more than about three seconds. The corrugation features and optional ion separator passages can rapidly infuse and/or diffuse an electrolyte throughout an electrode surface and inter-electrode spaces typically in no more than about two seconds. The corrugation features and optional ion separator passages can rapidly infuse and/or diffuse an electrolyte throughout an electrode surface and inter-electrode spaces in no more than about 1.5 seconds. The corrugation features and optional ion separator passages can rapidly infuse and/or diffuse an electrolyte throughout an electrode surface and inter-electrode spaces in typically no more than about one second. The corrugation features and optional ion separator passages can rapidly infuse and/or diffuse an electrolyte throughout an electrode surface and inter-electrode spaces in typically no more than about 0.75 second. The corrugation features and optional ion separator passages can rapidly infuse and/or diffuse an electrolyte throughout an electrode surface and inter-electrode spaces in typically no more than about 0.5 second. The corrugation features and optional ion separator passages can rapidly infuse and/or diffuse an electrolyte throughout an electrode surface and inter-electrode spaces in typically no more than about 0.25 second. The corrugation features and optional ion separator passages can rapidly infuse and/or diffuse an electrolyte throughout an electrode surface and inter-electrode spaces in typically less than about one second.

In accordance with some embodiments of the present disclosure, a chemical reserve battery using one or more corrugated electrodes can include one or both of a lithiated anode and a non-lithiated or partially lithiated cathode, either or both of which can be corrugated. The one or both of a lithiated anode and a non-lithiated or partially lithiated cathode can prime the chemical reserve battery using one or more corrugated electrodes, such as the electrochemical system, in a galvanic state (full charge state once the chemical reserve battery using one or more corrugated electrodes (the electrochemical system) is activated). Non-limiting examples of composition comprising the lithiated anode can be lithium, LiM (e.g., LiSi, LiAl, etc.) or addition to what is a commonly referred to as a stabilized lithium metal powder (SLMP) to graphite or other carbonaceous material or metal.

Figure 2:
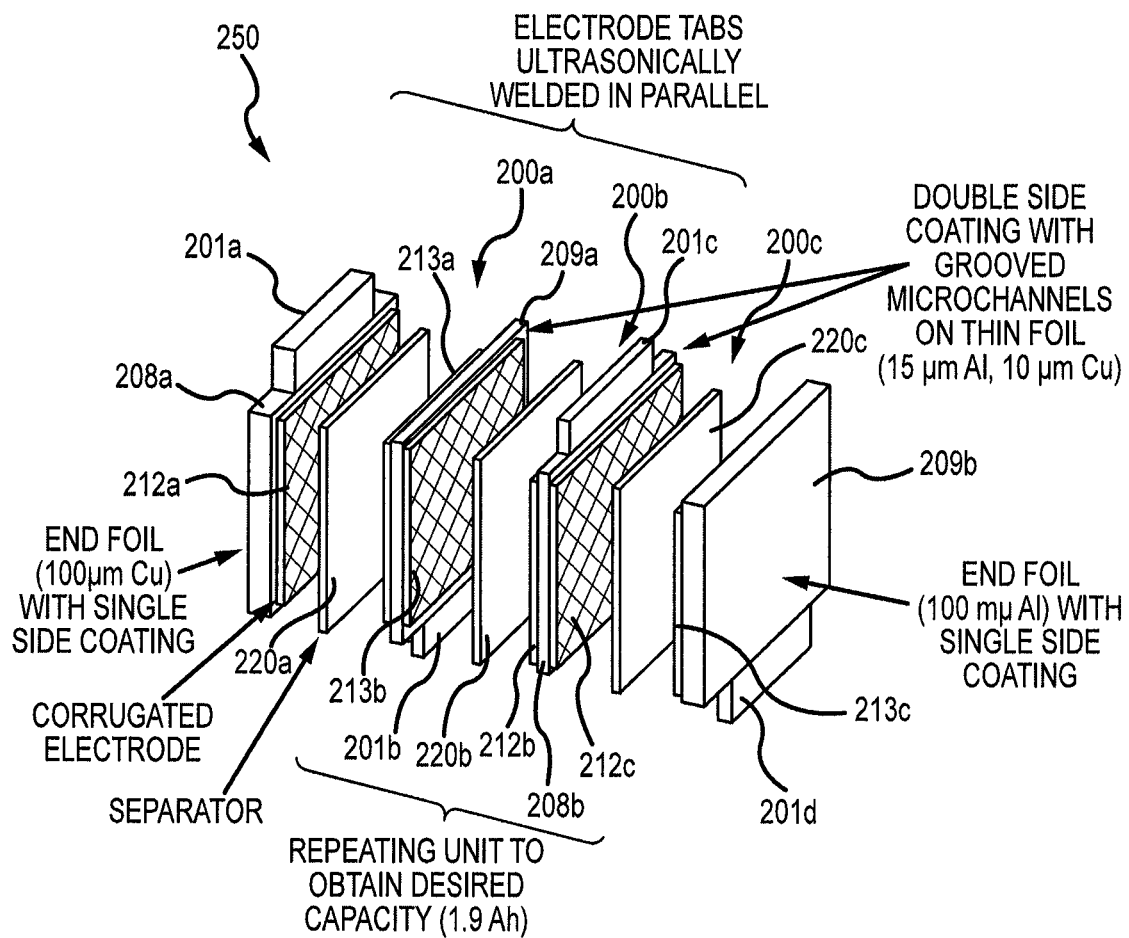
FIG. 2 depicts an electrochemical energy storage device and/or system according to some embodiments of the present disclosure.

FIG. 2 depicts the internal components of a cell 250 for the chemical reserve battery comprising multiple stacked or wrapped electrodes 200a-c in accordance with some embodiments of the present disclosure. Each electrode 200 includes negatively and positively charged first and second electrodes separated by a separator 220. The separator 220 generally electronically isolates first and second electrodes 208 and 209. The first separator 200a electronically isolates the first and second electrodes 208a and 209a that are, respectively, an anode and a cathode. Each of the first and second electrodes 208a and 209b can have corrugated first and second electrode surfaces 212a and 213a having accompanying corrugation features. The chemical reserve battery using one or more corrugated electrodes has multiple separators 220a, b, c, . . . electronically isolating alternatingly stacked anodes and cathodes. The first electrode 208a has only one corrugated surface. The second electrode 209a has opposing first and second surfaces, each of which can be corrugated as the second electrode 209a is shared by the first and second separators 220a,b. In the second electrode the second corrugated surface of the second electrode 209a electrically communicates with the first corrugated surface of a first electrode 208b. The third separator 220c, the first electrode 208b has an opposing second corrugated surface in electrical communication with a corrugated surface of a second electrode 209c. As in the first electrode 208a, the second electrode 209c has only one corrugated surface. The external current collectors 208a and 209b each have an outer face that is not coated. Each of the first and second electrodes 208 and 209 in each of the electrochemical systems has a corresponding current collector 201a-d and are separated by the respective separator 220a-c.

As can be seen from FIG. 2, the exteriors of the first electrode 208a and second electrode 209b exteriors are composed of significantly thicker foils than the interior electrodes with tab leads arbitrarily shown on opposite sides of the system. The system is encompassed with a packaging material (not shown; which may be laminated or not lamintated) with matched apertures to the system. The current collectors can be ultrasonically welded in parallel.

The first electrode 208 and/or corrugated surface 212 can comprise any electrically conductive material. Non-limiting examples of the first electrode 208 and/or corrugated surface 212, which acts as an anode, are carbon (e.g., graphite, activated carbon, hard carbon, or soft carbon), copper, silver, lithium, lithiated metal alloys (e.g. LiSi, LiSb, LiSn), lithiated metal oxides, aluminum, steel, and nickel. While not wanting to be limited by example, non-limiting examples of first electrode 208 and/or corrugated surface 212 anodic materials are graphite, activated carbon, hard carbon, soft carbon, lithiated metal alloys (e.g. LiSi, LiSb, LiSn) and lithiated metal oxides. Non-limiting examples of the first electrode 208 and/or corrugated surface 212 anodic materials are graphite, carbon, copper, silver, lithium, aluminum, steel, and nickel. Examples of first electrode and/or corrugated surface 212 anodic materials are without limitation are graphite, activated carbon, hard carbon, soft carbon, lithiated metal alloys (e.g. LiSi, LiSb, LiSn) and lithiated metal oxides.

The second electrode 209 and/or corrugated surface 212 can comprise any electrically conductive material. Non-limiting examples of the second electrode 209 and/or corrugated surface 212, which acts as a cathode, are lithium compounds and alloys. Non-limiting examples of the second electrode 209 and/or corrugated surface 212 material are lithium metal oxides, lithium metal phosphates, lithium chalcogenides and lithium metal alloys.

The separator 220 can be any ion permeable material, such as but not limited to an ion permeable membrane, typically known those of skill in art of electrochemical energy storage devices. Suitable separator 220 materials can be without limitation nonwoven fibers (cotton, nylon, polyesters, glass), polymer films (polyethylene, polypropylene, poly (tetrafluoroethylene), polyvinyl chloride), and naturally occurring substances (rubber, asbestos, wood).

Figure 24:
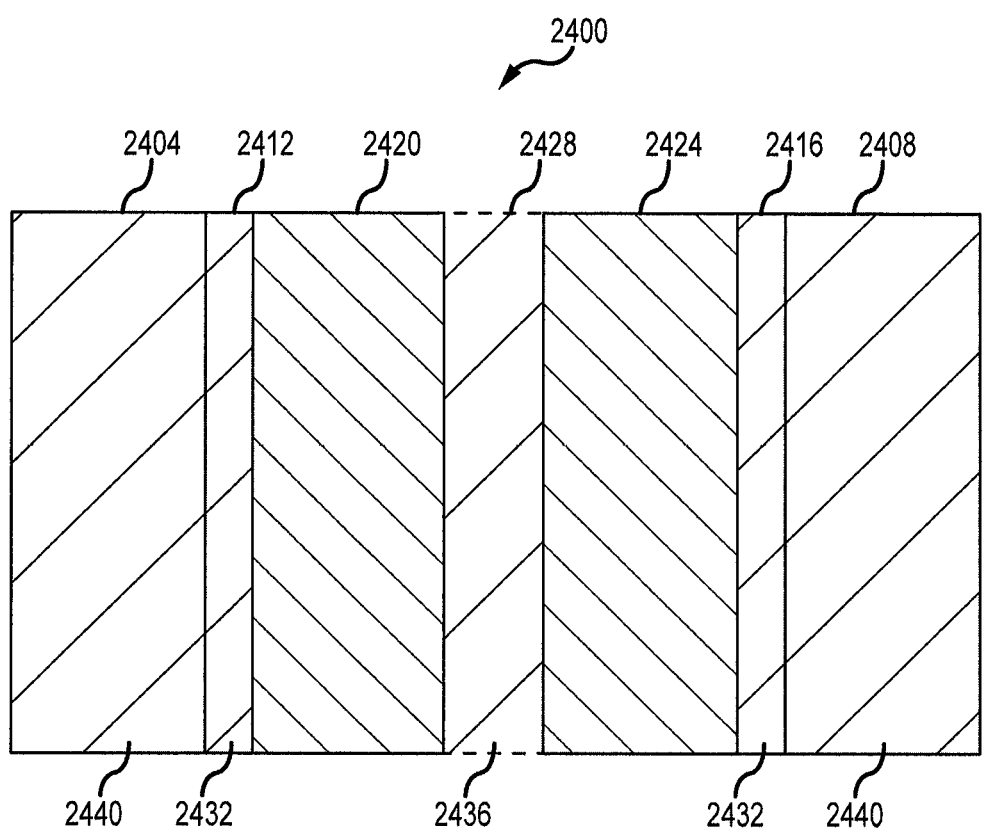
FIG. 24 depicts an electrochemical device or system according to an embodiment.

Referring to FIG. 24, an interior system 2400 of alternating or oppositely polarized electrodes is depicted. The pair comprises a first electrode 2404 and second electrode 2408, each comprising a corresponding first or second corrugation surface 2412 and 2416, respectively, and first or second electrolyte 2420 and 2424, respectively, with an intervening separator 2428. Each of the first and second electrodes 2404 and 2408 comprise plural first corrugation features 2440 passing through the depth or thickness of the corresponding electrode and each of the first and second corrugation surfaces 2412 and 2416 comprise plural first corrugation features 2432 passing from the corresponding first or second electrolyte through the depth or thickness of the surface to a surface of the corresponding electrode. Although only one corrugation surface is shown for each electrode, it is to be appreciated that the outwardly facing surface of each electrode can also have a first or second corrugation surface comprising first and second corrugation features, depending on the cell configuration. Likewise, the separator 2428 has plural passages 2436 passing through the depth or thickness of the separator from the first to the second electrolyte. Corresponding ones of the first corrugation features 2440 in each of the first and second electrodes, first corrugation features 2432 in each of the first and second corrugation surfaces 2412 and 2416, and the passages 2436 in the separator 2428 are axially aligned to provide continual flow paths for the electrolyte not only from the first electrode surface to the second electrode surface and vice versa but also through each of the first and second electrodes to adjacent electrode surfaces of other stacked or wrapped electrode pairs. When electrolyte is introduced into the battery, the aligned flow pathways enable the electrolyte to rapidly contact the electrically charged surfaces of the electrodes, thereby providing current.

Returning to FIG. 1 in one particular battery configuration, the current collectors 201 associated with the cathodic second electrodes 209 of the battery are ultrasonically welded together in parallel. The exterior current collectors 201a and 201d can be composed of a single side coating (toward the interior of the battery) and a thicker current collector (about 100 μm for electrodes of aluminum or copper). The thicker collector can serve as a system current lead and increase robustness. Moreover, electrodes can be a thin foil (such as, about 10 μm got copper or about 15 μm for aluminum) deposited on the corresponding current collector. Furthermore, the thicker system tab can be a thin foil with an active electrode material coated on both sides of the current collector.

A battery can comprise any number of alternating electrode pairs, such as one, two, three, four, five, six, seven, eight, nine, ten, eleven, or twelve alternating pairs. Generally, the battery can comprise from about 1 to about 100 alternating electrode pairs, more generally from about 2 to about 100 alternating electrode pairs, more generally from about 4 to about 80 alternating electrode pairs, more generally from about 4 to about 60 alternating electrode pairs, more generally from about 6 to about 40 alternating electrode pairs, and even more generally from about 6 to about 12 alternating electrode pairs.

The alternating electrode pairs can be in the form of laminated electrochemical electrodes. The laminated electrode pairs can be in a stacked arrangement. Moreover, the laminated electrode pairs can be stacked in a bipolar configuration. The bipolar stacking of the laminated, electrode pairs can provide one or both of an efficient stacking and a higher voltage electrochemical cell. It can be appreciated that the bipolar, stacked, laminated electrode pairs can be lithium-based alternating electrode pairs. The bipolar stacking of the laminated electrode pairs can provide an electrochemical cell having a capacity from about 100 Ah to about 1 mAh. The bipolar stacking of the laminated electrode pairs can provide an electrochemical cell having a capacity from about 95 Ah to about 100 mAh. The bipolar stacking of the laminated electrode pairs can provide an electrochemical cell having a capacity from about 90 Ah to about 200 mAh. The bipolar stacking of the laminated electrode pairs can provide an electrochemical cell having a capacity from about 85 Ah to about 300 mAh. The bipolar stacking of the laminated electrode pairs can provide an electrochemical cell having a capacity from about 80 Ah to about 400 mAh. The bipolar stacking of the laminated electrode pairs can provide an electrochemical cell having a capacity from about 85 Ah to about 500 mAh. The bipolar stacking of the laminated electrode pairs can provide an electrochemical cell having a capacity from about 80 Ah to about 600 mAh. The bipolar stacking of the laminated electrode pairs can provide an electrochemical cell having a capacity from about 75 Ah to about 700 mAh. The bipolar stacking of the laminated electrode pairs can provide an electrochemical cell having a capacity from about 70 Ah to about 800 mAh. The bipolar stacking of the laminated electrode pairs can provide an electrochemical cell having a capacity from about 65 Ah to about 900 mAh. The bipolar stacking of the laminated electrode pairs can provide an electrochemical cell having a capacity from about 60 Ah to about 1.0 Ah. The bipolar stacking of the laminated electrode pairs can provide an electrochemical cell having a capacity from about 55 Ah to about 1.5 Ah. The bipolar stacking of the laminated electrode pairs can provide an electrochemical cell having a capacity from about 50 Ah to about 2 Ah.

The bipolar stacking of the laminated electrode pairs can provide an electrochemical cell having a voltage from about 15 to about 400 V. The bipolar stacking of the laminated electrode pairs can provide an electrochemical cell having a voltage from about 16 to about 375 V. The bipolar stacking of the laminated electrode pairs can provide an electrochemical cell having a voltage from about 17 to about 350 V. The bipolar stacking of the laminated electrode pairs can provide an electrochemical cell having a voltage from about 18 to about 325 V. The bipolar stacking of the laminated sub-cells can provide an electrochemical cell having a voltage from about 19 to about 300 V. The bipolar stacking of the laminated electrode pairs can provide an electrochemical cell having a voltage from about 20 to about 275 V. The bipolar stacking of the laminated electrode pairs can provide an electrochemical cell having a voltage from about 21 to about 250 V. The bipolar stacking of the laminated electrode pairs can provide an electrochemical cell having a voltage from about 22 to about 225 V. The bipolar stacking of the laminated electrode pairs can provide an electrochemical cell having a voltage from about 23 to about 200 V. The bipolar stacking of the laminated electrode pairs can provide an electrochemical cell having a voltage from about 24 to about 175 V. The bipolar stacking of the laminated electrode pairs can provide an electrochemical cell having a voltage from about 25 to about 150 V. The bipolar stacking of the laminated electrode pairs can provide an electrochemical cell having a voltage from about 26 to about 125 V. The bipolar stacking of the laminated electrode pairs can provide an electrochemical cell having a voltage from about 27 to about 100 V. The bipolar stacking of the laminated electrode pairs can provide an electrochemical cell having a voltage from about 28 to about 75 V. The bipolar stacking of the laminated electrode pairs can provide an electrochemical cell having a voltage from about 28 to about 70 V.

While the benefits of the corrugated electrode are discussed with reference to lamination, prismatic stacking and/or bipolar battery configurations, the corrugated electrodes can be used beneficially in many other battery configurations, including those discussed above. For example, the battery can be configured as a cylindrical cell having electrodes wrapped at least partially around one another.

Figure 3:
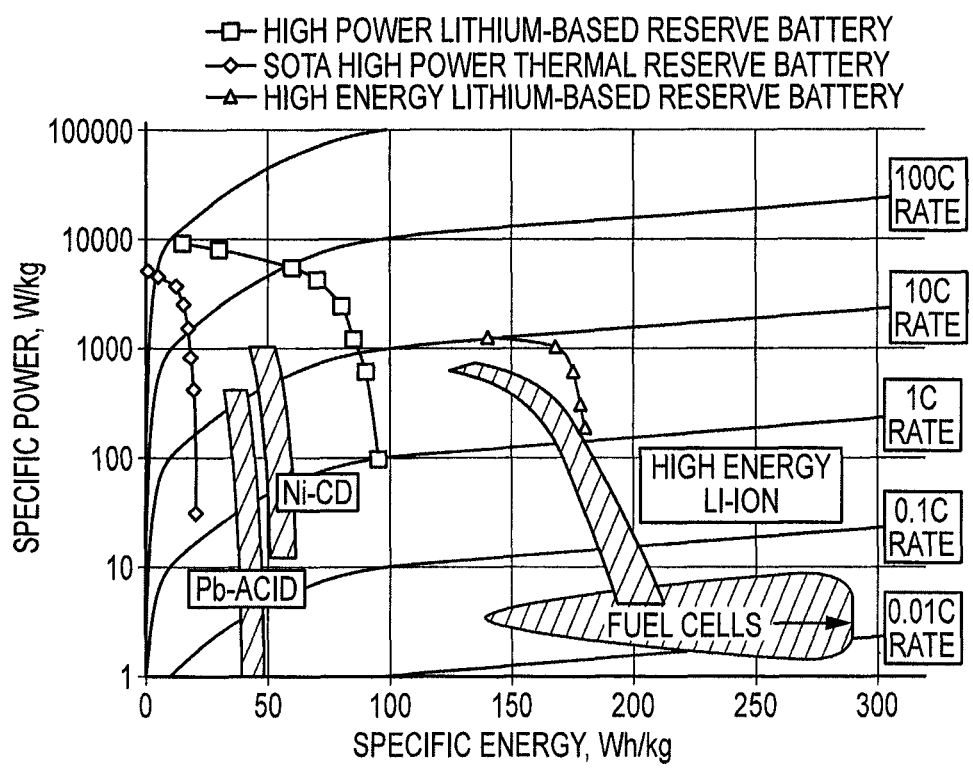
FIG. 3 depicts a plot of specific energy, in Wh/kg (horizontal axis), verses specific power (vertical axis), in W/kg, for electrochemical energy storage devices and systems of the prior art and according to some embodiments of the present disclosure.

Electrochemical batteries fabricated according to some of the embodiments of the present disclosure can have one or more of higher power and energy densities and the ability to operate over a wide temperature range and operating conditions than conventional reserve battery systems. FIG. 3 depicts predicted results for electrochemical systems fabricated according to some of the embodiments described herein. Depending on the cell design and particular lithium-based chemistry employed, the electrochemical systems fabricated according to some of the embodiments described herein have increases between five and ten times (or increases between 500% and 1000%) in specific energy and increases of at least two times (or increases of about 200%) in specific power over the current state of art of reserve batteries, as exemplified in the Ragone plot. It is further believed that one or more of the specific energy and specific power of the current state of art of batteries and/or reserve batteries can be improved through the incorporation of one or more of the corrugated electrodes described herein in some of the embodiments.

Another performance enhancement observed in electrochemical systems fabricated according to some of the embodiments of the present disclosure is the specific power of the reserve battery. The reserve battery described herein in some embodiments are projected to have specific power greater than 9 kW/kg when fabricated in a high power format with specific energy approaching 100 Wh/kg (see Ragone plot of FIG. 20). The electrochemical systems are also believed to have a continuous specific power greater than about 5 kW/kg in this high power format. Moreover, the electrochemical systems are also believed to have a pulse power of about 10 kW/kg in this high power format. Furthermore, it is believed that the reserve batteries fabricated according to some of the embodiments described herein could deliver at a lower specific power of more than about 200 Wh/kg. Other reserve battery enhancements can include a reduction of one or more of the electrochemical cell weight and volume. In accordance with some embodiments, the reserve battery weight reduction, compared to reserve batteries of the prior art, can be about 400% or more. In some embodiments, the electrochemical battery weight reduction, compared to reserve batteries of the prior art, can be no more than about 400%. In accordance with some embodiments, the reduction in the electrochemical battery volume can be about 300% or more, when compared to reserve batteries of the prior art. In some embodiments, the reduction in the electrochemical battery volume can be no more than about 300%, when compared to reserve batteries of the prior art. It is further believed that one or more of the electrochemical batteries weight and volume of the current state of art of batteries and/or reserve batteries can be improved through the incorporation of one or more of the corrugated electrodes described herein in some of the embodiments.

Another performance enhancement observed in electrochemical systems fabricated according to some of the embodiments of the present disclosure is the storage temperature range. In some embodiments, the storage temperature range of the electrochemical battery is from about −60 to about 110 degrees Celsius. In some embodiments, the storage temperature range is from about −58 to about 105 degrees Celsius. In some embodiments, the storage temperature range of the electrochemical battery is from about −55 to about 102 degrees Celsius. In some embodiments, the storage temperature range of the electrochemical battery is from about −54 to about 100 degrees Celsius. It is further believed that one or more of the storage temperature of the current state of art of battery and/or reserve batteries can be improved through the incorporation of one or more of the corrugated electrodes described herein in some of the embodiments. As will be appreciated, the storage temperature is extended due to the implementation of a reserve battery (not activated until utilization), not specifically due to the corrugated electrodes. Moreover, the storage temperature is extended compared to many traditional lithium systems.

Another performance enhancement observed in the electrochemical batteries fabricated according to some of the embodiments of the present disclosure is the operating temperature range. It can be appreciated that in some embodiments, the operating temperature range of the electrochemical batteries is from about −30 to about 100 degrees Celsius. In some embodiments, the operating temperature range of the electrochemical batteries is from about −35 to about 95 degrees Celsius. In some embodiments, the operating temperature range of the electrochemical batteries is from about −38 to about 92 degrees Celsius. In some embodiments, the operating temperature range of the electrochemical batteries is from about −40 to about 90 degrees Celsius. It is further believed that the operating temperature of the current state of art of batteries and/or reserve batteries can be improved through the incorporation of one or more of the corrugated electrodes described herein in some of the embodiments of the present disclosure. As will be appreciated, the operational temperature is extended due to the implementation of a reserve battery (not activated until utilization), not specifically due to the corrugated electrodes. Moreover, the operational temperature is extended compared to many traditional lithium systems.

Another performance enhancement observed in electrochemical battery fabricated according to some of the embodiments of the present disclosure is the rise temperature during activation. In some embodiments, there is no rise temperature during activation of the electrochemical battery. In some embodiments, the rise temperature of the electrochemical battery is less than about 0.1 degrees Celsius during activation. In some embodiments, the rise of the electrochemical battery is less than about 0 degrees Celsius during activation (that is the temperature after activation is less than the temperature prior to activation). In some embodiments, the rise temperature of the electrochemical battery is less than about 0.2 degrees Celsius during activation. In some embodiments, the rise temperature of the electrochemical battery is less than about 0.5 degrees Celsius during activation. In some embodiments, the rise temperature of the electrochemical battery is less than about 1 degree Celsius. In some embodiments, the rise temperature of the electrochemical battery is less than about 1.5 degrees Celsius during activation. In some embodiments, the rise temperature of the electrochemical battery is less than about 2.0 degrees Celsius during activation. In some embodiments, the rise temperature of the electrochemical battery is less than about 2.5 degrees Celsius during activation. In some embodiments, the rise temperature of the electrochemical battery is less than about 3 degrees Celsius during activation. In some embodiments, the rise temperature of the electrochemical battery is less than about 5 degrees Celsius during activation. It can be appreciated that the battery is immediately and sustainable for years thereafter, if necessary. Furthermore, the activation process of the present disclosure eliminates the need to coordinate pyrotechnics with activation process. It is further believed that one or more of the specific energy and specific power of the current state of art of reserve batteries can be improved through the incorporation of one or more of the corrugated electrodes described herein in some of the embodiments of the present disclosure.

Another performance enhancement observed in electrochemical batteries fabricated according to some of the embodiments of the present disclosure is the durability of electrochemical battery. An electrochemical battery fabricated according to some embodiments of the present disclosure can comprise solid-state systems. An electrochemical battery fabricated according to some embodiments of the present disclosure can have redundant electrical connections. It can be appreciated that one or both of the solid-state systems construction and the redundant electrical connections contained within the electrochemical batteries can make for a durable electrochemical battery that can withstand excess forces, such as vibrational forces. It is further believed that the durability of the current state of art of reserve batteries can be improved through the incorporation of one or more of the corrugated electrodes described herein in some of the embodiments of the present disclosure.

Another performance enhancement observed in electrochemical batteries fabricated according to some of the embodiments of the present disclosure is the ease of construction of the electrochemical battery. The lithium polymer fabrication according to some embodiments of the present disclosure can be less laborious than the current state of the art thermal battery construction or liquid-based cathode reserve battery systems. The fabrication of the corrugated electrodes according to some embodiments of the present disclosure can be less laborious than the current state of art thermal battery construction, particularly the thermal batteries activated by pyrotechnics. It is further believed that the ease of construction of the current state of art of batteries and/or reserve batteries can be improved through the incorporation of one or more of the corrugated electrodes described herein in some of the embodiments of the present disclosure.

Another performance enhancement observed in electrochemical batteries fabricated according to some of the embodiments of the present disclosure is the flexibility in the construction of the electrochemical battery. Some embodiments include flexibility in the planar footprint size of the electrochemical systems; such a degree of flexibility is not available within the current state of the art battery design. Furthermore, effectively any voltage and capacity can be constructed into a single rigid, hermetically sealed battery design, such design options are not currently available within the current state of the reserve battery design and fabrication. Moreover, the corrugated electrodes can be tailored to fit activation times. It is further believed that the flexibility of design and fabrication of the current state of art of batteries and/or reserve batteries can be improved through the incorporation of one or more of the corrugated electrodes described herein in some of the embodiments of the present disclosure.

Another performance enhancement observed in electrochemical batteries fabricated according to some of the embodiments of the present disclosure is the improved safety of the electrochemical battery. In some embodiments, the lower operating temperatures of battery are generally safer to operate than the current state of art reserve batteries that typically require pyrotechnics for activation. Moreover, current reserve batteries commonly generate excessive heat, while the electrochemical systems of the present disclose usually generate little, if any, excess heat. It is further believed that the safety of the current state of art of batteries and/or reserve batteries can be improved through the incorporation of one or more of the corrugated electrodes described herein in some of the embodiments of the present disclosure.

In accordance with some embodiments is the ability to provide practically any voltage desired in a single electrochemical battery by adding additional electrodes. This ability to design practically any electrochemical battery voltage is not available within traditional reserve batteries. Lithium electrochemical systems are commonly limited to voltages of from about 2 to about 5 volts depending on the cell chemistry and the electrodes need to be electrochemically isolated when placed in series connection. Moreover, a bipolar electrochemical cell configuration is often prohibitive in traditional lithium batteries due to electrochemical oxidation of the current collectors at high potentials, which commonly leads to subsequent loss of the current collectors and battery failure. With the electrochemical battery of present disclosure the deleterious reaction is negligible due to the short time the cell is activated. An electrochemical battery, in particular a bipolar electrochemical cell as described herein, is therefore not only applicable, but desired, to obtain a high voltage in a single battery that can be activated without cell isolation. The bipolar design also affords the same flexibility to increase capacity by adding additional electrodes to each cell. The bipolar battery can eliminate the need for multiple cell enclosures and electrolyte fill systems. Rather, a single hermetically sealed rigid container can house the high capacity, high voltage battery.

It can be further appreciated that the cell configuration can be based upon a traditional stacked planar electrode lithium electrochemical cell design. In some embodiments, cell tabs can be oriented on opposite sides of the cell stack (FIG. 1) to accommodate power, or along the same side to maximize energy density. It can also be appreciated that in some embodiments, the cell tabs can be oriented on one side or the other of the cell stack. Within an electrochemical cell, the cell anodes and cathodes are generally stacked alternately. The electrochemical cell typically includes a thin multi-layer plastic laminate positioned between each of electrode pairs with matched apertures to the electrode apertures to allow for electrolyte permeation while isolating the electrode pairs from shorting through electrolyte. Generally, electrodes internal to the cell are ultrasonically welded in parallel. That is the cell tabs associated with the anodes of the electrochemical system stack are ultrasonically welded together in parallel.

Figure 4:
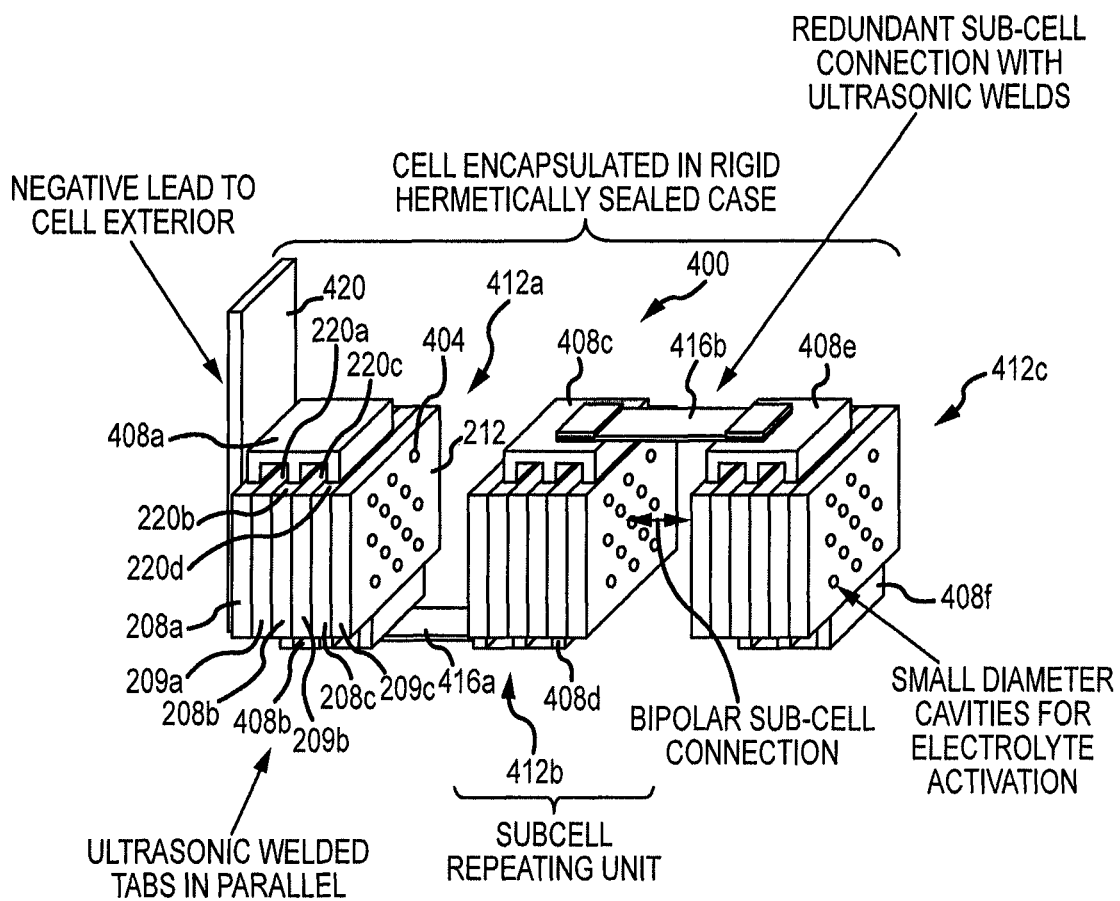
FIG. 4 depicts an electrochemical energy storage device and/or system according to some embodiments of the present disclosure.

With reference to FIG. 4, the chemical reserve battery 400 can have many different configurations. The reserve battery can comprise any number of cells composed of multiple electrode pairs, such as six (28V) or twelve (56V) high capacity cells electrically interconnected in a series configuration. With reference to FIG. 4, multiple cells 412a-c, each cell 412 comprising alternating pairs of first and second electrodes 208 and 209 separated by a separator 220, are electrically connected to one another. Within each cell 412, adjacent alternating electrode pairs are also separated by a separator 220. No separator 220 is positioned between adjacent cells 412. Each of the first and second electrodes in each cell 412 has at least one corrugated surface 212. The outermost electrodes in any cell 412 can have only one corrugated surface 212 while those sandwiched between adjacent electrodes typically have opposing corrugated surfaces 212 on either side of the electrode.

Figure 5:
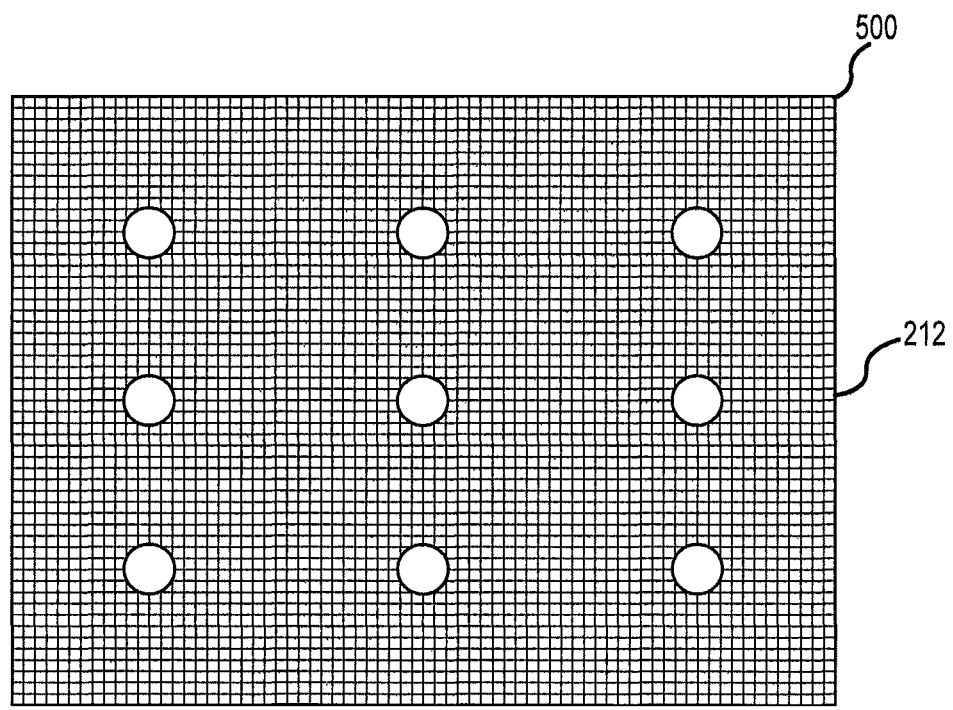
FIG. 5 depicts a corrugated electrode of an electrochemical energy storage device and/or system according to some embodiments of the present disclosure.

FIGS. 4-5 depict an embodiment of a corrugated surface 212. The surface 212 comprises perforations, voids, apertures, cavities or holes 404 dispersed at selected intervals over the face of the corrugated electrode. The perforations, voids, apertures, cavities or holes 404 can pass partially or completely through the electrode and may or may not be aligned with one another through the stacked electrodes in each cell. Commonly, the perforations, voids, apertures, cavities or holes 404 pass completely through the electrodes positioned interiorly of the cell but not through the electrodes (such as electrode 208a adjacent the negative lead 420) positioned exteriorly of the cell. Typically, they are aligned to enable the electrolyte to flow through the entire electrode stack. As shown in FIG. 5, each corrugated surface comprises a network of interconnected channels or grooves 500 (denoted by the solid lines) to enable the electrolyte to flow from the perforations or holes or voids 404 into the channels or grooves 500, thereby dispersing the electrolyte laterally over the face, not just longitudinally through the face of, the electrode. The sizes of the perforations, voids, apertures, cavities or holes 404 and channels or grooves 500 are large enough to enable atoms of the electrolyte to pass therethrough.

Electrical interconnections amongst the stacked cells can be made by conductive structures 408a-c connected with the various common types of electrodes in each cell 412a-c. In the first cell 412a, a first conductive structure 408a is connected to each first electrode 208a-c and a second conductive structure 408b is connected to each second electrode 209a-c (which are polarized oppositely to the first electrodes) such that the first and second conductive structures 408a and b are electrically connected in parallel to the stacked electrodes; in the second cell 412b, the first conductive structure 408d is connected to each first electrode 208a-c and the second conductive structure 408c is connected to each second electrode 209a-c (which are polarized oppositely to the first electrodes) such that the first and second conductive structures 408d and c are electrically connected in parallel to the stacked electrodes; and in the third cell 412c, the first conductive structure 408e is connected to each first electrode 208a-c and the second conductive structure 408f is connected to each second electrode 209a-c (which are polarized oppositely to the first electrodes) such that the first and second conductive structures 408e and f are electrically connected in parallel to the stacked electrodes. To electrically connect the cells 412a-c in series, a first electrically conductive bridge 416a connects the second conductive structure 408b in the first cell 412a to the first conductive structure 408d in the second cell 412b; a second electrically conductive bridge 416b connects the second conductive structure 408c in the second cell 412b to the first conductive structure 408e in the third cell 412c; and so on to the next cell (not shown). A negative lead 420 is connected to the first conductive structure 408a and a similar positive lead (not shown) is connected to the final second conductive structure in the last cell in the battery 400.

The first and second conductive structures 408 are connected to corresponding electrodes and to the conductive bridges 416 by ultrasonic welding or other suitable techniques. These ultrasonically welded together redundant tab leads form a durable redundancy within the electrochemical bipolar cell.

Electrical current passes through the electrical series interconnections and can, thereafter, be substantially evenly distributed to the electrodes through parallel connections. This ability to interconnect the bipolar electrode pairs electrically in parallel and the adjacent cells electrically in series can solve a problem of the chemical reserve batteries of the prior art, the ability to construct a chemical reserve battery having a particular capacity and voltage in single sealed container. A battery having any practical capacity and voltage in a single hermetically sealed rigid container can be constructed. Furthermore, the power to energy ratio of the battery can be, in contrast to batteries of the prior art, constructed for specific applications and for specific electrochemical system needs. Moreover, such batteries can be constructed with traditional lithium electrochemical systems.

The foregoing components are typically encapsulated in a rigid hermetically sealed enclosure (not shown). The rigid enclosure can comprise any material. In some embodiments, the rigid enclosure can be a high strength plastic, a metal, or combination thereof. The rigid enclosure can be a structural support. Moreover, the rigid enclosure can comprise a durable material. It can be appreciated that the rigid enclosure can hermetically seal the electrochemical energy storage device and/or system. Generally, the electrodes and separator of the electrochemical storage device and/or system can be hermetically sealed by the rigid enclosure.

Some embodiments of the present disclosure include activating the chemical reserve battery. In accordance with some embodiments, the activation of the battery includes a rapid infusion of an electrolyte into the battery. The infusion of the electrolyte into the battery includes one or more of rapid spreading and wetting of the electrode surfaces by flow of the electrolyte longitudinally through the electrode stack via through perforations or holes or voids 404 and laterally along the face of each corrugated electrode via the interconnected network of grooves or channels 500. An advantage of the rapid spreading and/or wetting of the electrode surfaces by the electrolyte is that the electrochemical energy storage device and/or system can be activated and reach its desired voltage in typically less than about a second. Applications within the prior art generally require a short "priming" period and/or a readying stage that usually include providing heat or time for activation, which is not always possible and require periods exceeding a few seconds.

A non-limiting example of activating a chemical reserve battery will be illustrated with a bipolar solid state lithium reserve battery. In accordance with some embodiments, rapid activation of a bipolar lithium reserve battery can be by one or more of forced or passive diffusion of an electrolyte by flow of the electrolyte longitudinally through the electrode stack via through perforations, voids, apertures, cavities or holes 404 and laterally along the face of each corrugated electrode via the interconnected network of grooves or channels 500. As shown in FIG. 5, the corrugation features can form a network of orientated holes and/or channels and/or grooves having a pattern, such as but not limited to a symmetric pattern of corrugation features throughout one or more electrodes of the bipolar lithium reserve battery. Such electrode architectures generally achieve one or more of rapid spreading and wetting of the electrode surfaces by the electrolyte. Moreover, the electrolyte flow is typically substantially unimpeded in all directions throughout the electrochemical energy storage device and/or system as the electrolyte rapidly spreads and wets the electrode surfaces; that is, the electrolyte flows along the electrode architecture substantially uniformly along the electrode face's x and y-axes through the corrugation feature network and the z-axis through the corrugation features. As can be appreciated by those of skill in the art, variation of the size and number of corrugation features within one or more of the network of the corrugation features can affect electrolyte flow within the electrochemical energy storage device and/or system. For example, variation of the size and number of corrugation features within the corrugation features can affect electrolyte diffusion distance within the electrochemical energy storage device and/or system. Moreover, the size and number of corrugation features within the one or more of the network of the corrugation features can affect the activation time to achieve total spreading and wetting of the electrode surfaces.

Providing corrugation features on the active electrode surface can impact one or more of the energy and power density of the electrochemical energy storage device and/or system. In some embodiments, at least about 0.001% of the electrically active surface area (e.g., the electrode surface area that interacts with the electrolyte to either reduce or oxidize a compound, ion or element) comprises or is part of a corrugation feature. In some embodiments, at least about 0.01% of the electrically active surface area comprises or is part of a corrugation feature. In some embodiments, at least about 0.1% of the electrically active surface area comprises or is part of a corrugation feature. In some embodiments, at least about 0.25% of the electrically active surface area comprises or is part of a corrugation feature. In some embodiments, at least about 0.5% of the electrically active surface area comprises or is part of a corrugation feature. In some embodiments, at least about 0.75% of the electrically active surface area comprises or is part of a corrugation feature. In some embodiments, at least about 1% of the electrically active surface area comprises or is part of a corrugation feature. In some embodiments, at least about 0.75% of the electrically active surface area comprises or is part of a corrugation feature. In some embodiments, at least about 5% of the electrically active surface area comprises or is part of a corrugation feature. In some embodiments, at least about 0.75% of the electrically active surface area comprises or is part of a corrugation feature. In some embodiments, at least about 10% of the electrically active surface area comprises or is part of a corrugation feature. In some embodiments, no more than about 1.5% of the electrically active surface area comprises or is part of a corrugation feature. In some embodiments, no more than about 2% of the electrically active surface area comprises or is part of a corrugation feature. In some embodiments, no more than about 3% of the electrically active surface area comprises or is part of a corrugation feature. In some embodiments, no more than about 4% of the electrically active surface area comprises or is part of a corrugation feature. In some embodiments, no more than about 5% of the electrically active surface area comprises or is part of a corrugation feature. In some embodiments, no more than about 6% of the electrically active surface area comprises or is part of a corrugation feature. In some embodiments, no more than about 7% of the electrically active surface area comprises or is part of a corrugation feature. In some embodiments, no more than about 8% of the electrically active surface area comprises or is part of a corrugation feature. In some embodiments, no more than about 9% of the electrically active surface area comprises or is part of a corrugation feature. In some embodiments, no more than about 10% of the electrically active surface area comprises or is part of a corrugation feature. In some embodiments, no more than about 11% of the electrically active surface area comprises or is part of a corrugation feature. In some embodiments, no more than about 12% of the electrically active surface area comprises or is part of a corrugation feature. In some embodiments, no more than about 13% of the electrically active surface area comprises or is part of a corrugation feature. In some embodiments, no more than about 14% of the electrically active surface area comprises or is part of a corrugation feature. In some embodiments, no more than about 15% of the electrically active surface area comprises or is part of a corrugation feature. In some embodiments, no more than about 16% of the electrically active surface area comprises or is part of a corrugation feature. In some embodiments, no more than about 17% of the electrically active surface area comprises or is part of a corrugation feature. In some embodiments, no more than about 18% of the electrically active surface area comprises or is part of a corrugation feature. In some embodiments, no more than about 19% of the electrically active surface area comprises or is part of a corrugation feature. In some embodiments, no more than about 20% of the electrically active surface area comprises or is part of a corrugation feature. In some embodiments, no more than about 21% of the electrically active surface area comprises or is part of a corrugation feature. In some embodiments, no more than about 22% of the electrically active surface area comprises or is part of a corrugation feature. In some embodiments, no more than about 23% of the electrically active surface area comprises or is part of a corrugation feature. In some embodiments, no more than about 24% of the electrically active surface area comprises or is part of a corrugation feature. In some embodiments, no more than about 25% of the electrically active surface area comprises or is part of a corrugation feature. In some embodiments, no more than about 26% of the electrically active surface area comprises or is part of a corrugation feature. In some embodiments, no more than about 27% of the electrically active surface area comprises or is part of a corrugation feature. In some embodiments, no more than about 28% of the electrically active surface area comprises or is part of a corrugation feature. In some embodiments, no more than about 29% of the electrically active surface area comprises or is part of a corrugation feature. In some embodiments, no more than about 30% of the electrically active surface area comprises or is part of a corrugation feature. In some embodiments, no more than about 31% of the electrically active surface area comprises or is part of a corrugation feature. In some embodiments, no more than about 32% of the electrically active surface area comprises or is part of a corrugation feature. In some embodiments, no more than about 33% of the electrically active surface area comprises or is part of a corrugation feature. In some embodiments, no more than about 35% of the electrically active surface area comprises or is part of a corrugation feature. In some embodiments, no more than about 40% of the electrically active surface area comprises or is part of a corrugation feature. In some embodiments, no more than about 45% of the electrically active surface area comprises or is part of a corrugation feature. In some embodiments, no more than about 50% of the electrically active surface area comprises or is part of a corrugation feature. In some embodiments, no more than about 55% of the electrically active surface area comprises or is part of a corrugation feature. In some embodiments, no more than about 60% of the electrically active surface area comprises or is part of a corrugation feature. In some embodiments, no more than about 65% of the electrically active surface area comprises or is part of a corrugation feature. In some embodiments, no more than about 70% of the electrically active surface area comprises or is part of a corrugation feature. In some embodiments, no more than about 75% of the electrically active surface area comprises or is part of a corrugation feature. In some embodiments, no more than about 80% of the electrically active surface area comprises or is part of a corrugation feature. In some embodiments, no more than about 90% of the electrically active surface area comprises or is part of a corrugation feature. In some embodiments, no more than about 92% of the electrically active surface area comprises or is part of a corrugation feature. In some embodiments, no more than about 94% of the electrically active surface area comprises or is part of a corrugation feature. In some embodiments, no more than about 96% of the electrically active surface area comprises or is part of a corrugation feature. In some embodiments, no more than about 98% of the electrically active surface area comprises or is part of a corrugation feature. In some embodiments, no more than about 99% of the electrically active surface area comprises or is part of a corrugation feature. In some embodiments, no more than about 100% of the electrically active surface area comprises or is part of a corrugation feature.

The number of corrugation features per square unit of the active surface area can be substantially constant or variable over the active surface area. With reference to the corrugated electrode of FIGS. 16A-C, for example, the number of corrugation features per square unit of the active surface area is substantially constant while with reference to the corrugated electrode of FIG. 21 the number of corrugation features per unit square unit of the active surface area is variable over the active surface area. More specifically, the number of corrugation features per square unit of the active surface in the corrugated electrode of FIG. 21 increase near perforations, voids, apertures, holes, or cavities for accelerated wetting by the electrolyte and decreases at distance away from the perforations, voids, apertures, holes, or cavities to substantially maximize energy density.

The dimensions of the grooves and/or channels can vary depending on the application. The grooves and/or channels can have an average, mean and/or mode width or depth of at least about 5 μm. The grooves and/or channels can have an average, mean and/or mode width or depth of at least about 7 μm. The grooves and/or channels can have an average, mean and/or mode width or depth at least about 9 μm. The grooves and/or channels can have an average, mean and/or mode width or depth of at least about 10 μm. The grooves and/or channels can have an average, mean and/or mode width or depth of at least about 12 μm. The grooves and/or channels can have an average, mean and/or mode width or depth of at least about 14 μm. The grooves and/or channels can have an average, mean and/or mode width or depth of at least about 15 μm. The grooves and/or channels can have an average, mean and/or mode width or depth of at least about 16 µm. The grooves and/or channels can have an average, mean and/or mode width or depth of at least about 18 µm. The grooves and/or channels can have an average, mean and/or mode width or depth of at least about 20 µm. The grooves and/or channels can have an average, mean and/or mode width or depth of no more than about 30 µm. The grooves and/or channels can have an average, mean and/or mode width or depth of no more than about 35 µm. The grooves and/or channels can have an average, mean and/or mode width or depth of no more than about 40 µm. The grooves and/or channels can have an average, mean and/or mode width or depth of no more than about 45 µm. The grooves and/or channels can have an average, mean and/or mode width or depth of no more than about 50 µm. The grooves and/or channels can have an average, mean and/or mode width or depth of no more than about 55 µm. The grooves and/or channels can have an average, mean and/or mode width or depth of no more than about 60 µm. The grooves and/or channels can have an average, mean and/or mode width or depth of no more than about 65 µm. The grooves and/or channels can have an average, mean and/or mode width or depth of no more than about 70 µm. The grooves and/or channels can have an average, mean and/or mode width or depth of no more than about 80 µm. The grooves and/or channels can have an average, mean and/or mode width or depth of no more than about 90 µm. The grooves and/or channels can have an average, mean and/or mode width or depth of no more than about 100 µm. The grooves and/or channels can have an average, mean and/or mode width or depth of no more than about 200 µm. The grooves and/or channels can have an average, mean and/or mode width or depth of no more than about 300 µm. The grooves and/or channels can have an average, mean and/or mode width or depth of no more than about 400 µm. The grooves and/or channels can have an average, mean and/or mode width or depth of no more than about 500 µm. The grooves and/or channels can have an average, mean and/or mode width or depth of no more than about 600 µm. The grooves and/or channels can have an average, mean and/or mode width or depth of no more than about 700 µm. The grooves and/or channels can have an average, mean and/or mode width or depth of no more than about 800 µm. The grooves and/or channels can have a width or depth of no more than about 900 µm. The grooves and/or channels can have an average, mean and/or mode width or depth of no more than about 1 mm. The perforations, voids, apertures, holes or cavities can have an average, mean and/or mode diameter of at least about 1 µm. The perforations, voids, apertures, holes or cavities can have an average, mean and/or mode diameter of at least about 20 µm. The perforations, voids, apertures, holes or cavities can have an average, mean and/or mode diameter of at least about 50 µm. The perforations, voids, apertures, holes or cavities can have an average, mean and/or mode diameter of at least about 100 µm. The perforations, voids, apertures, holes or cavities can have an average, mean and/or mode diameter of at least about 150 µm. The perforations, voids, apertures, holes or cavities can have an average, mean and/or mode diameter of at least about 200 µm. The perforations, voids, apertures, holes or cavities can have an average, mean and/or mode diameter of no at least about 250 µm. The perforations, voids, apertures, holes or cavities can have an average, mean and/or mode diameter of at least about 300 µm. The perforations, voids, apertures, holes or cavities can have an average, mean and/or mode diameter of at least about 350 µm. The perforations, voids, apertures, holes or cavities can have an average, mean and/or mode diameter of at least about 400 µm. The perforations, voids, apertures, holes or cavities can have an average, mean and/or mode diameter of at least about 425 µm. The perforations, voids, apertures, holes or cavities can have an average, mean and/or mode diameter of at least about 450 µm. The perforations, voids, apertures, holes or cavities can have an average, mean and/or mode diameter of at least about 475 µm. The perforations, voids, apertures, holes or cavities can have an average, mean and/or mode diameter of at least about 500 µm. The perforations, voids, apertures, holes or cavities can have an average, mean and/or mode diameter of at least about 525 µm. The perforations, voids, apertures, holes or cavities can have an average, mean and/or mode diameter of at least about 550 µm. The perforations, voids, apertures, holes or cavities can have an average, mean and/or mode diameter of at least about 575 µm. The perforations, voids, apertures, holes or cavities can have a diameter of at least about 600 µm. The perforations, voids, apertures, holes or cavities can have an average, mean and/or mode diameter of at least about 625 µm. The perforations, voids, apertures, holes or cavities can have an average, mean and/or mode diameter of at least about 700 µm. The perforations, voids, apertures, holes or cavities can have an average, mean and/or mode diameter of no more than about 50 mm. The perforations, voids, apertures, holes or cavities can have an average, mean and/or mode diameter of no more than about 45 mm. The perforations, voids, apertures, holes or cavities can have an average, mean and/or mode diameter of no more than about 40 mm. The perforations, voids, apertures, holes or cavities can have an average, mean and/or mode diameter of no more than about 35 mm. The perforations, voids, apertures, holes or cavities can have a diameter of no more than about 30 mm. The perforations, voids, apertures, holes or cavities can have an average, mean and/or mode diameter of no more than about 25 mm. The perforations, voids, apertures, holes or cavities can have an average, mean and/or mode diameter of no more than about 20 mm. The perforations, voids, apertures, holes or cavities can have an average, mean and/or mode diameter of no more than about 15 mm. The perforations, voids, apertures, holes or cavities can have an average, mean and/or mode diameter of no more than about 14 mm. The perforations, voids, apertures, holes or cavities can have an average, mean and/or mode diameter of no more than about 13 mm. The perforations, voids, apertures, holes or cavities can have an average, mean and/or mode diameter of no more than about 12 mm. The perforations, voids, apertures, holes or cavities can have an average, mean and/or mode diameter of no more than about 10 mm. The perforations, voids, apertures, holes or cavities can have an average, mean and/or mode diameter of no more than about 9 mm. The perforations, voids, apertures, holes or cavities can have an average, mean and/or mode diameter of no more than about 8 mm. The perforations, voids, apertures, holes or cavities can have an average, mean and/or mode diameter of no more than about 7 mm. The perforations, voids, apertures, holes or cavities can have an average, mean and/or mode diameter of no more than about 6 mm. The perforations, voids, apertures, holes or cavities can have an average, mean and/or mode diameter of no more than about 5 mm. The perforations, voids, apertures, holes or cavities can have an average, mean and/or mode diameter of no more than about 4 mm. The perforations, voids, apertures, holes or cavities can have an average, mean and/or mode diameter of no more than about 3 mm. The perforations, voids, apertures, holes or cavities can have an average, mean and/or mode diameter of no more than about 2 mm.

The perforations, voids, apertures, holes or cavities can have an average, mean and/or mode diameter of no more than about 1 mm.

It can be appreciated by those of skill in the art that the number and physical size of the perforation features can affect one or more of the energy, power density and activation time of the electrochemical energy storage device and/or system. It is believed that groove and/or channel widths of about 100 nm to about 250 µm can impart unintuitive properties to one or more of the energy, power density and activation time of the electrochemical energy storage device and/or system. In particular, the Reynolds number (which compares the effect of momentum of a fluid to the effect of viscosity) can become very low. As such, the electrolyte will not necessarily flow and mix in the traditional sense. Rather, the electrolyte will follow the physics of microfluidic flow and transport can be dominated by molecular diffusion. Hence, the electrolyte flow regimes will generally follow one or more of creeping flow, potential flow, pressure driven flow, or more combination thereof. It is therefore expected that electrolyte flow and activation time will be likely influenced of Debye length (e.g., charge carrier electrostatic effects on the channel and/or groove flows), friction losses (Darcy-Weisbach equation) and Reynolds number. The effects can be understood using a fully developed Navier-Stokes Equation shown below (assuming incompressible, Newtonian fluids):

$$f_v = \rho\left[\frac{\partial}{\partial t}v + (v \cdot \nabla)v\right] = f_{pressure} + f_{friction} + f_{volume},$$

where v is flow velocity, $\rho$ is fluid density, $f_{pressure}$=force due to pressure head, $f_{friction}$=force due to frictional losses and $f_{volume}$=body forces acting on the fluid. In some embodiments, a viscosity-driven response of microfluidic flow could impede the one or more of rapid spreading and wetting of the electrode surfaces by the electrolyte. Furthermore, according to some embodiments, the physical size of the channel network should be generally minimized.

It can be appreciated that some embodiments of the present disclosure can include electrodes having any shape. In some embodiments, the electrodes can have a shape generally resembling a rectangular box. In some embodiments, the electrodes can have a shape generally resembling a cylinder. In some embodiments, the electrodes can have a shape generally resembling one of an arch, curve, concaved, convex, crescent, or dome.

It can be appreciated that in some embodiments, the electrochemical energy storage device and/or system can have any shape. In some embodiments, the electrochemical energy storage device and/or system can have a shape generally resembling a rectangular box. In some embodiments, the electrochemical energy storage device and/or system can have a shape generally resembling a cylinder. In some embodiments, the electrochemical energy storage device and/or system can have a shape generally resembling one of an arch, curve, concaved, convex, crescent, or dome.

It can be appreciated that some embodiments of the present disclosure can include an activation mechanism. The activation mechanism can be any suitable activation mechanism. Non-limiting examples of possible activation mechanisms can include manual, automated, mechanical, electrical, hydraulic, and any combination thereof. Generally, prior to activation, the electrochemical energy storage device and/or system is/are devoid of the electrolyte. Typically, the electrochemical energy storage device and/or system electrolyte comprise one or more electrolyte input ports. The one or more inputs are usually in fluid communication with electrolyte. The electrolyte is typically stored in one of an electrolyte reservoir, pouch, tank, container, receptacle, or such. It can be appreciated that the one of the electrolyte reservoir, electrolyte pouch, electrolyte tank, electrolyte container, electrolyte receptacle, or such is in fluid communication with the one or more electrolyte input ports. The activation mechanism can include the step of transporting the electrolyte through an input line from the one of an electrolyte reservoir, pouch, tank, container, receptacle to the one or more electrolyte input ports. Moreover, the activation mechanism can include introducing the electrolyte through the one or more electrolyte input ports into the electrochemical energy storage device and/or system. Furthermore, the activation mechanism can include after the introduction of the electrolyte into the electrochemical energy storage device and/or system the step of one or more of spreading and wetting the surfaces of the electrodes with the electrolyte. For example, the electrochemical energy storage device and/or system can be constructed in an annular design to allow for a spring activated burst disc as with many other chemical reserve systems, or constructed in a prismatic block with an actuated piston pushing electrolyte into the cell, as well as many other possibilities. Due to the elevated operating temperatures, thermal batteries require immediate use after activation, but there is no need to coordinate activation with the actual use of the electrochemical energy storage device and/or system according to some of the embodiments of the present disclosure. The electrochemical storage device and/or system can be activated from one of less than a second, a second, to seconds, minutes, hours, or even days, to weeks, or months prior to use, without degradation or adverse effects. Furthermore, the electrochemical energy storage device and/or system can be activated during a high g-force event or other process and/or method of activation.

Some embodiments of the present disclosure include texturing or patterning of an electrode. In some embodiments of the present disclosure include texturing or patterning of one or more electrodes of an electrochemical energy storage device and/or system. Generally, the texturing or patterning can be done by a laser ablation process. The ablation can be by a high intensity pulsed laser. The laser can be typically coupled to a three-axis scanhead. Moreover, the laser ablation can form the perforation features on the electrode. The perforation features can form a network of one or more orientated channels and/or grooves having a pattern on the electrode. Moreover, the ablation can form a symmetric pattern of perforations, voids, apertures, cavities and/or holes on the electrode. The laser ablation can comprise a process of removing material from a solid (or occasionally liquid) surface by irradiating it with a laser beam. The ablation is a laser cutting process utilizing high intensity, fast moving beams with a small spot size. Furthermore, the laser ablation process generally comprises one or more of an optical beam scanning systems and a high brightness laser that can provide a highly efficient method of beam delivery. The laser ablation process can comprise galvanometer scanner technology. The galvanometer scanner technology can include high-performance rotary motors that produce high dynamic beam deflection. The low mass and inertia of the laser ablation systems can enable high scanning speeds (typically of more than about 15 m/s) and acceleration (generally of up to about 10 g). The scanning speed is commonly about 2 m/s or more. With automation of the laser, the scanning speed can be about 5 m/s or more. The scanning speed for cutting the one or more of the channels and/or grooves can be up to about 15 m/s. Any size electrode with any number of holes and channels and/or grooves can therefore be cut with high quality in less than a second ensuring a path to processing while minimizing cost. The electrode can be cut by one or more of combination of very high energy densities (usually of about $10^8$ W/cm$^2$) in a very small laser spot (generally of no more than about 20 μm) with very high speed beam movement. The laser ablation process generally does not require any cutting gas as the melt in the cut kerf is partially vaporized and partially ejected by very high vapor pressure under extreme conditions of temperature and melt pool dynamics. Costly dies that hindered flexibility and require substantial maintenance are not required, and cut quality is improved in the laser ablation process. Some of the advances of laser ablation over die cut are one of more of: die cutting not amenable to rapid, scalable design changes, whereas laser ablation has a small footprint and is amenable to rapid prototyping and design changes; die cutting generally produces one or more of distinct edge debris, burrs, shards, and poor tolerance cuts, whereas laser ablation generally produces minimal edge debris, heat effected zone and scalloping with exceptional tolerances; die cutting is generally considered a high maintenance process, whereas laser ablation is commonly considered to be a low maintenance process; and die cutting is considered to have low reliability, whereas laser ablation is considered to have a high degree of reliability. Hence, laser ablation of electrodes can have the one or more of the following advantages: low cost fully automated cutting process; lower production cost; high throughput with maximum electrode cutting speeds from about 4 to about 5 m/s; -channels and/or grooves and holes cut at speeds approaching 15 m/s; unsurpassed cut/grooving quality with precision and accuracy exceeding stamped processes and other remote laser cutting operations; no geometrical design constraints to electrode size, cutouts and channels and/or grooves; maximum size of electrode restricted by image field size (of about 300 mm or more in one or more of length and width) of scanner which is often much larger than a lithium electrode footprint; flexible and quick footprint modification; durable, robust, nearly maintenance free system; straightforward integration of cutting system into production (process any standard electrode roll for cutting); and projected fully automated system to function at speeds of one of more than about 10 electrodes/min, of about 20 electrodes/min, of about 30 electrodes/min, of about 40 electrodes/min, of about 50 electrodes/min, of about 60 electrodes/min, of about 70 electrodes/min, of about 80 electrodes/min, of about 90 electrodes/min, or of about 100 electrodes/min.

Some embodiments of the present disclosure include laminated electrochemical cell assemblies. The laminated electrochemical cell assemblies can be laminated by a process that includes one or more of heat and pressure. Generally, the laminated electrochemical cell assemblies have increased durability. That is, laminated electrochemical cell assemblies generally do not fail, that is they usually successfully pass tests that mimic high gravitational-force accelerations. Lamination of the electrochemical cell assembly can mitigate this phenomenon. The lamination of the electrochemical cell assembly can include a separator containing a melt polymer (such as for example a melt polymer from CELGARD INC.™) that serves to adhere the electrode to the separator. Adhering the electrode to the separator with an adhesive, such as with hot melt polymeric material, can laminate the electrochemical cell assembly. Moreover, the laminating of the electrochemical cell assembly can maintain the contact of electrode and separator under high gravitational-force accelerations. In other words, the laminating of the electrochemical cell assembly can increase the durability of the cell assembly.

EXAMPLES

The following examples are provided to illustrate certain aspects, embodiments, and configurations of the disclosure and are not to be construed as limitations on the disclosure, as set forth in the appended claims. All parts and percentages are by weight unless otherwise specified.

High voltage bipolar prismatic pouch cells were fabricated and demonstrated electrochemically as set forth in the examples below.

Example 1—Construction of a High Voltage Bipolar Prismatic Pouch Cell

Figure 8A:
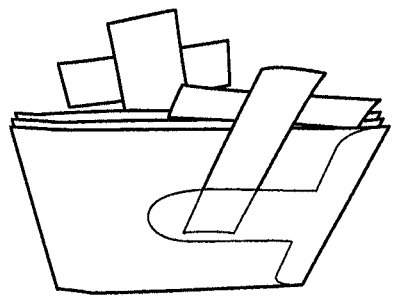
FIG. 8A depicts a laminated electrochemical cell stack according to some embodiments of the present disclosure.
Figure 8B:
FIG. 8B depicts a laminated electrochemical cell stack according to some embodiments of the present disclosure.
Figure 9:
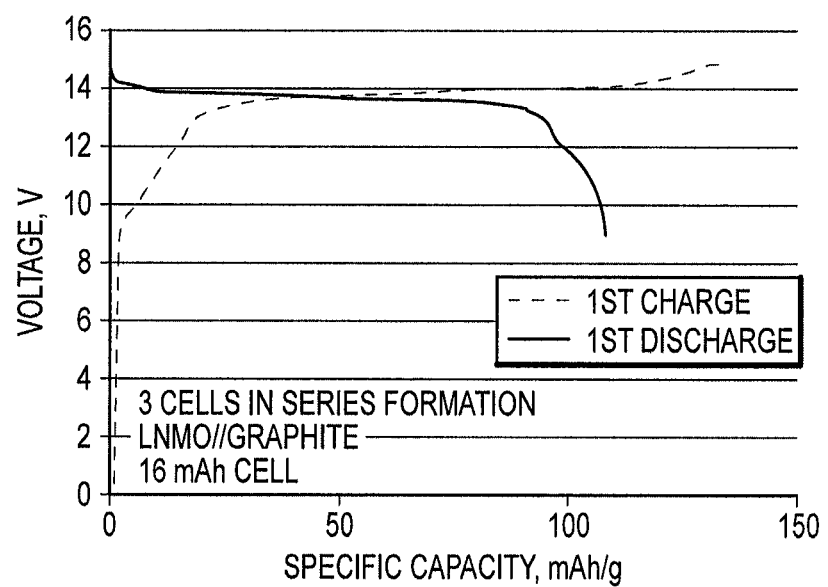
FIG. 9 depicts a specific capacity, mAh/g, (horizontal axis) versus voltage, V, (vertical axis) plot of an electrochemical cell stack according to some embodiments of the present disclosure.

FIGS. 6A, 6B, 7A and 7B show a single laminated bipolar electrochemical cell before (FIG. 6A) and after packaging (FIG. 6B) having a 100 μm aluminum tab and a copper current collector prior to (FIG. 7A) and after being adhered to together (FIG. 7B) to form an electrochemical cell. The electrochemical cells can be arranged in series, FIG. 8A shows three electrochemical cels in series to form an electrochemical battery (FIG. 8B). The electrochemical performance of the three cells stacked in series and as a battery is depicted in FIG. 9. The stacked cells are comprised of a graphite//LNMO electrochemical couple. The battery had a potential of 13.84 V and produced a capacity of 16 mAh.

Example 2—Construction of a Laminated Electrochemical Sub-Cell Stack

Figure 10A:
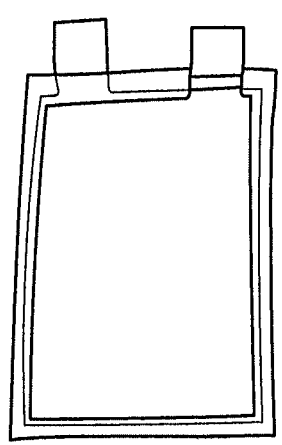
FIG. 10A depicts an electrochemical cell without channels and/or grooves according to some embodiments of the present disclosure.
Figure 10B:
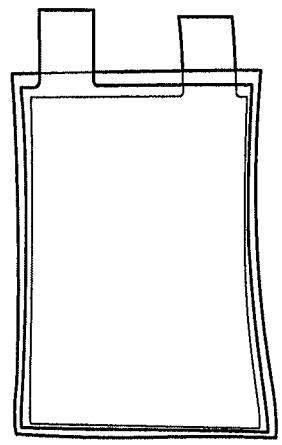
FIG. 10B depicts an electrochemical cell with channels and/or grooves according to some embodiments of the present disclosure.
Figure 10C:
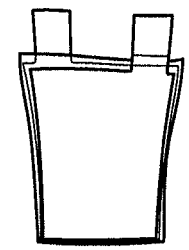
FIG. 10C depicts the interfacial contact between the corrugated electrodes and separator in an electrochemical cell according to some embodiments of the present disclosure.

As a precursor to laminating an electrochemical cell stack, an electrochemical bi-cell containing one cathode and one anode with a separator between the electrodes was laminated. The separator comprised a polyspun polyvinylidene fluoride (PVDF) coated polyolefin separator from CELGARD INC®. The electrodes and separator were assembled for intimate contact with no gaps in adhesion. This assembly represented a baseline for continued development of increased durability and robustness thereafter. Electrodes with and without channels and/or grooves exhibited excellent adhesion to the interfacial surface. FIGS. 10A-B depict laminated electrochemical bi-cells laminated without (left) and with (middle) channels and/or grooves. The electrochemical bi-cell on the right held in an upright position shows the interfacial contact between the electrodes and separator.

Example 3—Demonstration of Micro-Channels and Cavities Achieved by Laser Ablation FIGS. 11A-B depict on the left (FIG. 11A) a laser-ablated cathode and on the right (FIG. 11B) a laser-ablated anode, each having micro-channels and/or micro-grooves and cavities. In the lower frame of FIG. 11A is an enlargement of laser-ablated cathode showing micro-channels and/or micro-grooves and apertures and voids. The anode and cathode were prepared from 24 cm$^2$ sheet of graphite coated onto a copper substrate and LNMO cathode coated onto aluminum substrate, respectively. High quality (i.e., qualitatively precision linear and curved cuts without shards or burrs) micro-channels and/or micro-grooves and apertures and/or voids were formed by high speed laser ablation of the sheet. The micro-channels were cut at speeds of up to 2 m/s.

Figure 12:
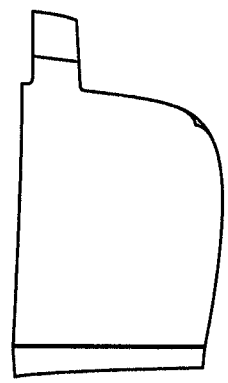
FIG. 12 depicts a degree of electrolyte spreading and/or wetting for a corrugated electrode according to some embodiments of the present disclosure.
Figures 13A, 13B, 13C:
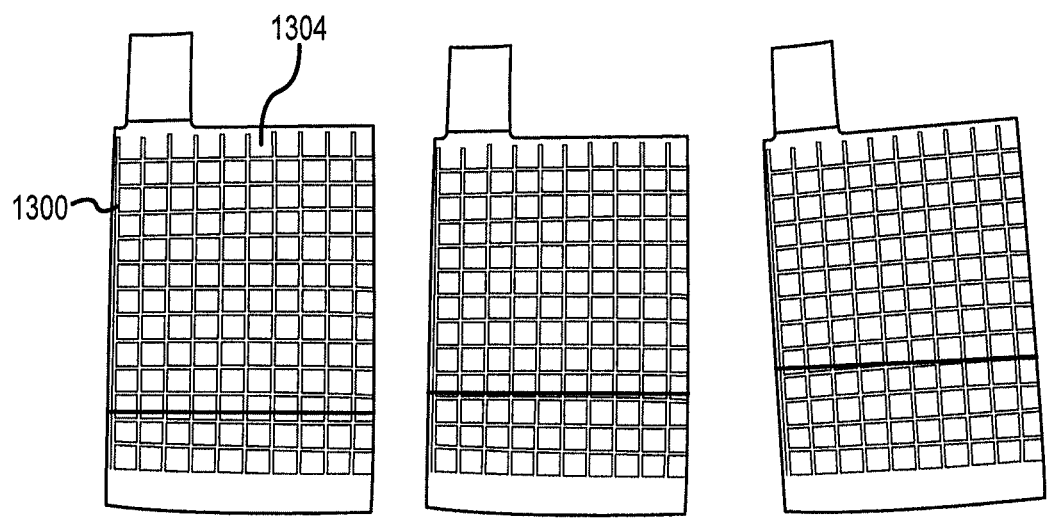
FIG. 13A depicts a degree of electrolyte spreading and/or wetting for a corrugated electrode according to some embodiments of the present disclosure.
FIG. 13B depicts a degree of electrolyte spreading and/or wetting for a corrugated electrode according to some embodiments of the present disclosure.
FIG. 13C depicts a degree of electrolyte spreading and/or wetting for a corrugated electrode according to some embodiments of the present disclosure.
Figures 14A, 14B, 14C:
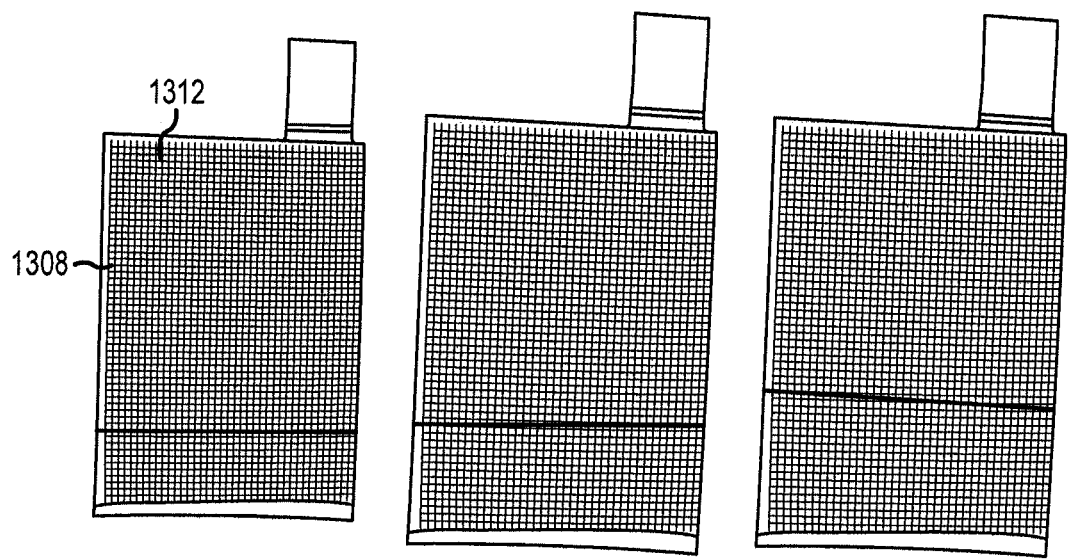
FIG. 14A depicts a degree of electrolyte spreading and/or wetting for a corrugated electrode according to some embodiments of the present disclosure.
FIG. 14B depicts a degree of electrolyte spreading and/or wetting for a corrugated electrode according to some embodiments of the present disclosure.
FIG. 14C depicts a degree of electrolyte spreading and/or wetting for a corrugated electrode according to some embodiments of the present disclosure.

Example 4—Comparison of Electrolyte Diffusion Times of Corrugated and Non-Corrugated Electrodes Electrolyte diffusion rates for corrugated and non-corrugated electrodes as well as laminated cell stacks were determined. The electrolyte diffusion rates showed rapid electrolyte diffusion within the laminated stacked cells. The evaluations involved placing an electrode stack or stacked electrodes within an electrochemical energy storage device and/or system or a series of stacked electrode pairs in an electrolyte bath and monitoring the wicking rate. Electrolyte diffusion rates were determined for electrodes lacking micro-channels and/or micro-grooves and for electrodes having different types of micro-channels and/or micro-grooves. FIG. 12 depicts the degree of electrolyte wicking for an electrode lacking, that is devoid of, any micro-channels and/or micro-grooves. The horizontal line drawn across the electrode shows the level of electrolyte wicking after 300 seconds of emersion of the electrode edge in the electrolyte. The horizontal line was substantially at about the line where the electrode contacted the electrolyte. Hence, the electrolyte was not substantially wicked, if any, by the electrode lacking, that is electrode devoid of micro-channels and/or micro-grooves. FIGS. 13A-B and 14A-C depict the degree of electrolyte wicking for electrodes having micro-channels and/or micro-grooves. The horizontal lines drawn across the electrodes, going from left to right, are height that the electrolyte wicked after 30, 60 and 300 seconds immersion in the electrolyte, respectively. The micro-channels and/or micro-grooves of the electrode of FIG. 13A (left image) and 13B (right image) (shown as horizontal lines 1300 and vertical lines 1304 laid out in a grid- or checker-board pattern) were 4 mm spaced corrugations, and the electrolyte migration was dispersed laterally with time as electrolyte was directed along the 4 mm spaced micro-channel and/or micro-groove corrugations. The micro-channels and/or micro-grooves for the electrode of FIGS. 14A (left image), 14B (middle image) and 14C (right image) (shown as horizontal lines 1308 and vertical lines 1312 laid out in a grid- or checker-board pattern) were 1 mm spaced corrugations. Compared to the electrolyte wicking of electrode having the 4 mm spaced corrugations (FIG. 13A-B), the electrolyte wicking for the electrode having 1 mm spaced micro-channel and/or micro-groove corrugations, the electrolyte wicked along the entire width of electrode. It is believed that the electrolyte migration proceeded along the entire width of electrode due to closer spacing of the 1 mm micro-channels and/or micro-grooves, compared to 4 mm spaced micro-channels and/or micro-grooves.

Figure 15:
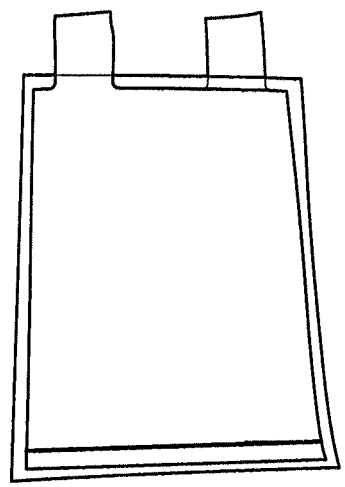
FIG. 15 depicts a degree of electrolyte spreading and/or wetting for a corrugated electrode according to some embodiments of the present disclosure.
Figures 16A, 16B, 16C:
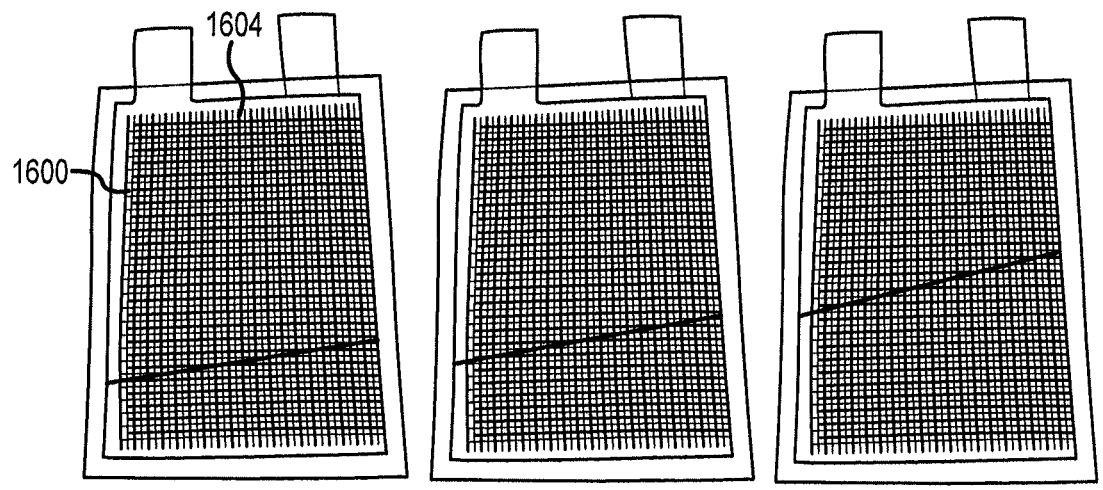
FIG. 16A depicts a degree of electrolyte spreading and/or wetting for a corrugated electrode according to some embodiments of the present disclosure.
FIG. 16B depicts a degree of electrolyte spreading and/or wetting for a corrugated electrode according to some embodiments of the present disclosure.
FIG. 16C depicts a degree of electrolyte spreading and/or wetting for a corrugated electrode according to some embodiments of the present disclosure.

To demonstrate electrolyte 'wicking' for fast activation times in a relevant format, a laminated cell stack was constructed that consisted of a cathode sandwiched between two anodes. The electrodes (that is, the cathode and the anodes) comprised 1 mm spaced micro-channel and/or micro-groove corrugations. FIG. 15 shows electrolyte wicking characteristics, shown by the line drawn across the laminated cell stack lacking (that is, devoid of) micro-channels and/or micro-grooves (in the form of horizontal lines and vertical lines laid out in a grid- or checker-board pattern). Electrolyte wicking was not observed after 300 seconds of immersion in the electrolyte. Following the immersion of the laminated cell stack lacking (that is devoid of) any micro-channels and/or micro-grooves in the electrolyte, a destructive physical analysis of the laminated cell stack showed that the electrolyte did not migrate into the laminated cell stack. FIGS. 16A-16C show electrolyte wicking for a laminated cell stack above an electrolyte bath. The electrodes of the laminated cell pack have laser-fabricated micro-channels and/or micro-grooves (in the form of horizontal lines 1600 and vertical lines 1604 laid out in a grid- or checker-board pattern) spaced 1 mm apart micro-channel and/or micro-groove corrugations. The lines drawn across the laminated cell stack show the degree of electrolyte migration into the laminated cell pack after 30 (left), 60 (middle), and 300 seconds (right) immersion of the laminated cell stack in the electrolyte. The presence of micro-channels and/or micro-grooves resulted in a profound effect on electrolyte migration and/or wicking rate. Following the conclusion of the immersion (that is, after 300 seconds of immersion), a destructive physical analysis of the laminated cell stack confirmed that electrolyte migrated more than about half-way up the length of the stack on both the interior and exterior of the stack.

Electrolyte migration was characterized by referencing the electrolyte migration front to the overall height or area of the electrode. Results for the various configurations are shown in FIG. 24. The electrolyte migration rates were observed to be much more rapid when the micro-channels and/or micro-grooves were present. Further, the electrodes having corrugated micro-channels and/or micro-grooves had a more complete or total wetting of the electrode by the electrolyte throughout the electrolyte migration than the electrode lacing any micro-channels and/or micro-grooves or electrodes having non-corrugated or more greatly spaced micro-channels and/or micro-grooves. It can be appreciated that the degrees of one or more of electrolyte migration and electrode wetting can be controlled by the electrode micro-channels and/or micro-groove system. While not wanting to be bound any theory and/or example, it is believed that one or more of the rate of electrolyte migration and degree of electrolyte wetting of electrode can be controlled by one or more of shape of micro-channels and/or micro-grooves, surface density of micro-channels and/or micro-grooves on the electrode surface, the spacing apart of the micro-channels and/or micro-grooves, the width and thickness of the micro=channels and/or microgrooves and a combination thereof. For example, the addition of additional micro-channels and/or micro-grooves promoted an enhanced wicking rate and absolute height/area of wetting.

Figure 17:
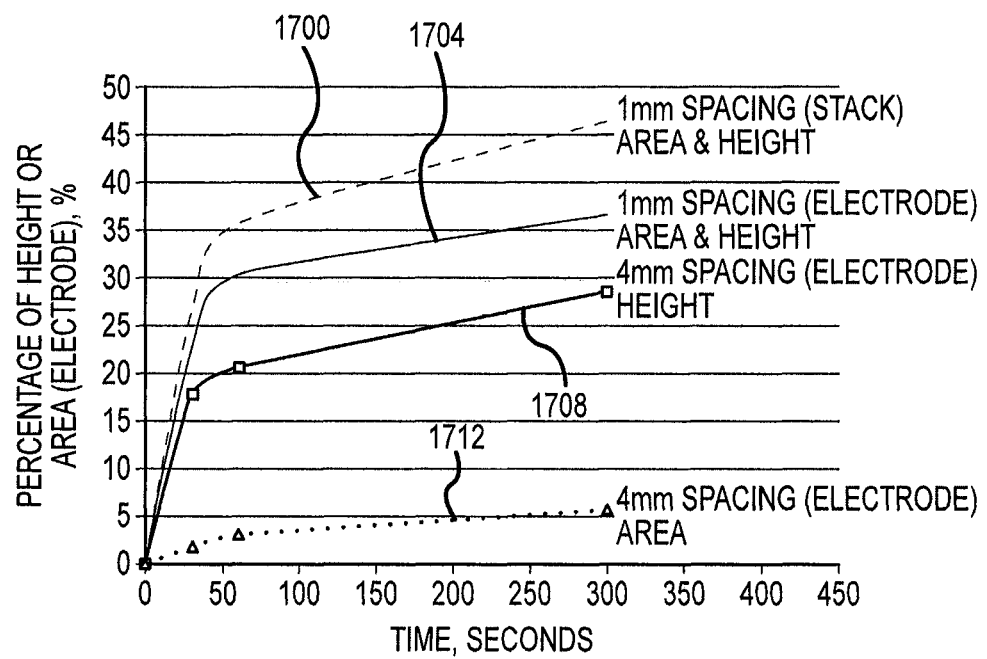
FIG. 17 depicts a plot of time, seconds, versus percentage height of height or area of a corrugated electrode according to various embodiments of the present disclosure.

FIG. 17 depicts wetting profiles for various micro-channel and/or micro-groove configurations: an electrode with 4 mm spaced micro-channels and/or micro-grooves (lines 1708 and 1712 with diamond markers representing percentage of overall area and square markers representing percentage of overall height of electrolyte migration); an electrode with 1 mm spaced micro-channels and/or micro-grooves (line 1704 representing percentages for overall height and area of electrolyte migration); and cell stack with 1 mm spaced micro-channels and/or micro-grooves on all electrodes of the cell stack (line 1700 representing percentages of overall height and area of electrolyte migration). The initial rate of electrolyte migration height was observed to be similar for both the 4 mm and 1 mm spaced micro-channel and/or micro-groove corrugations. The closer spaced micro-channel and/or micro-groove corrugations (1 mm) reached a higher maximum height of electrolyte migration than the greater spaced micro-channel and/or micro-groove corrugations (4 mm). Moreover, it is important to note that the entire width of the electrode was observed to be wet with the 1 mm spaced micro-channel and/or micro-groove corrugations whereas the electrodes with the 4 mm spaced micro-channel and/or micro-groove corrugations wetted primarily along the micro-channel and/or micro-groove corrugations and the electrolyte did not appear to migrate much beyond the immediate region of the micro-channel and/or micro-groove corrugations. The single electrode tests and electrodes in the laminated cell stack studies achieved substantially complete wetting across the width of the electrodes when micro-channel and/or micro-groove spacing system (that is, one or more of micro-channel and/or micro-groove spacing, shape, and surface density) were properly adjusted. The percentage area wet was therefore observed to be substantially higher for the 1 mm spaced micro-channel and/or micro-groove corrugations. Also, the cell stack approached a higher maximum electrolyte migration height and degree of area wetted than that observed for the single electrode specimens. It is believed that the presence of the separator in the cell stack could have a beneficial effect on electrolyte migration. Furthermore, the height of the electrolyte migration front approached an asymptotic maximum where the surface tension (due to microfluidic capillary action) of the electrolyte had reached an equilibrium state with gravitational forces.

Example 5—Development of a Thin-Film Coated Lithium Silicon Anode for Priming of Stacked Cells-Containing Electrodes Having Micro-Channels and/or Micro-Grooves Silicon is an example of a material having a high theoretical specific capacity. As such, silicon is an excellent host for lithium electrochemical energy storage systems. Moreover, when alloyed with lithium, as for example in the form of $Li_{4.4}Si$, the silicon lithium can have a theoretical specific capacity of about 4200 mAh/g or more. However, conventional silicon electrodes, more particularly anodes, can suffer from rapid capacity decay due to mechanical fracture caused by large volume changes such as volume changes resulting in the volume increasing by more than about 300% during repeated electrochemical lithium insertion/extraction encountered in lithium batteries. A primary (single discharge) battery averts the necessity for repetitive cycling while benefitting from the large storage capacity of silicon. In addition, utilizing lithium silicon alloy powder can provide an opportunity to implement a lithiated anode into a thin-film coating that can be processed with traditional lithium manufacturing methods.

The following are some non-limiting examples of lithium silicon alloys according to embodiments of the present disclosure: a commercially available 44 wt % lithium-containing alloy, $Li_{0.44}Si_{0.56}$, that has a lower reactivity compared to higher lithiated alloys; lithiated graphitic anodes; a non-lithiated electrode containing lithium foil to infuse the non-lithiated electron with lithium; and a metal foil or mesh current collector that has been implemented with a lithium foil. Such lithium silicon systems can form a lithium-rich anode having a high energy density. However, such systems may not be amenable to traditional lithium manufacturing methods.

The following example demonstrates a method of using an existing thermal battery technology, specifically of using a lithium silicon alloy ($Li_{0.44}Si_{0.56}$), as a primer for stacked cells. When utilized in thermal batteries, $Li_{0.44}Si_{0.56}$ is generally combined with a binder and pressed into a pellet. However, when the $Li_{0.44}Si_{0.56}$ is to be utilized as a primer for stacked cells, it was combined with a polymeric binder, e.g. poly (phenylene) oxide dissolved in anisole solvent to form a lithium silicon alloy polymeric binder mixture. The lithium silicon alloy polymeric binder mixture was then coated as a thin-film on a current collector to form a lithium-containing anode. It is necessary to process and coat these materials under an inert atmosphere to prevent parasitic reactions. The $Li_{0.44}Si_{0.56}$ was received from ROCKWOOD Lithium®. Poly (phenylene oxide) and anisole were received from Sigma-Aldrich®. This binder system was amenable to the highly reductive alloy powder and permitted thin-film coating of lithium-based powders.

The following is a non-limiting example of a thin-film lithium silicon active material coating and an electrochemical analysis thereof. Aluminum foil was treated with a carbon coating of approximately a micron thickness. The electrochemical degradation of aluminum was not a concern because the study was concerned with the single, short-term discharge properties of the electrode. The lithium silicon alloy was homogenized with a binder solution and conductive carbon in an inert environment (i.e., argon gas) to for a slurry.

Figure 18:
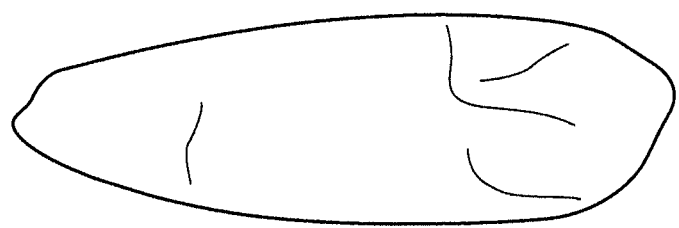
FIG. 18 depicts a coated corrugated electrode according to some embodiments of the present disclosure.
Figure 19:
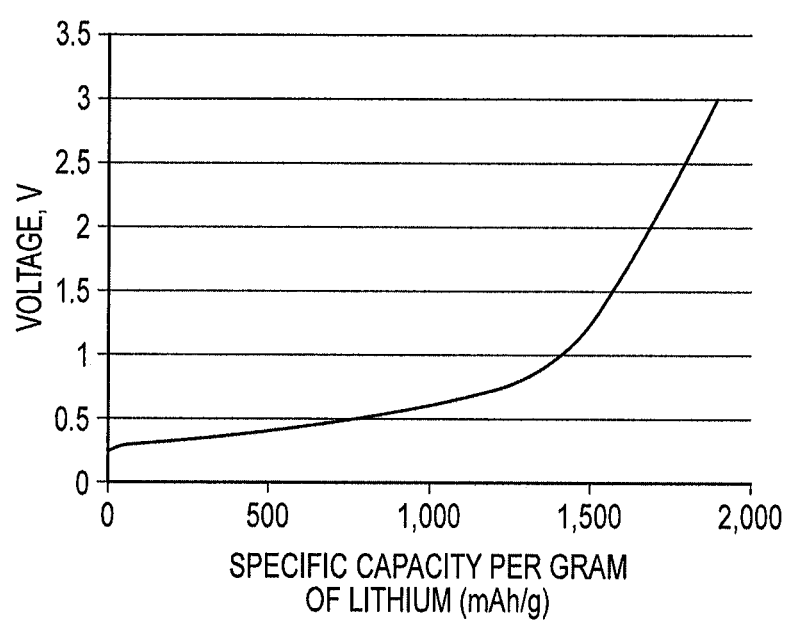
FIG. 19 depicts a plot of the specific capacity, mAh/g, (horizontal axis) versus voltage, V, (vertical axis) of an electrode according to some embodiments of the present disclosure.

The slurry was coated on the pretreated aluminum foil (FIG. 18). Electrodes were cut and electrochemically activated with heating under Argon at about 190 degrees Celsius for about 30 minutes. Electrochemical systems were fabricated from the activated electrodes. The charge profile for the electrochemical systems is shown in (FIG. 19). The electrodes demonstrated a specific capacity of about 3862 mAh/g, which is approximately half of the theoretical value of lithium. The reduction of specific capacity it believed to be attributed to processing in the presence of moisture from the ambient environment. It is further believed that processing in a dry room would prevent lithium from reacting with moisture and would accordingly in the specific capacity of the electrode.

Figure 20:
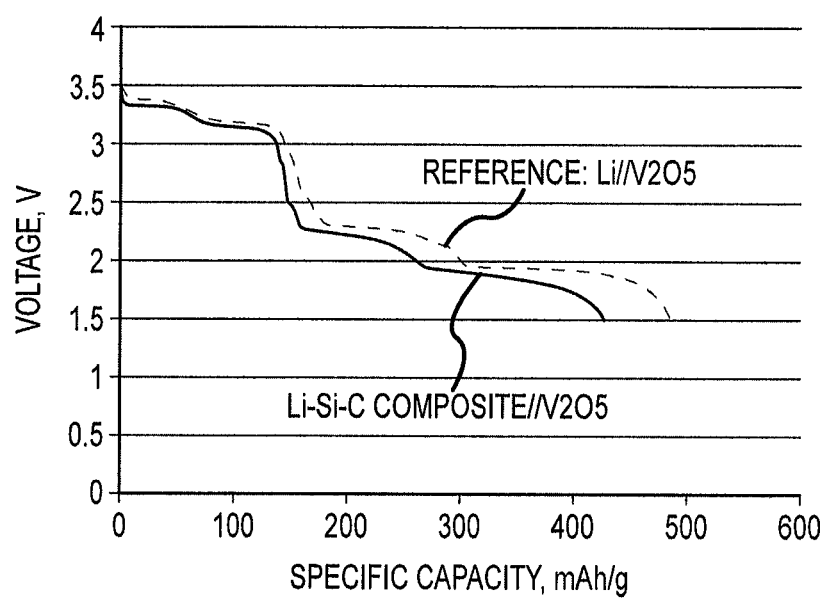
FIG. 20 depicts a plot of the specific capacity, mAh/g, (horizontal axis) versus voltage, V, (vertical axis) of various electrochemical cell according to some embodiments of the present disclosure.

The following is a non-limiting example of a thin-film lithium silicon active material coated electrode subsequently coupled to a $V_2O_5$ cathode and an electrochemical analysis thereof, which also including the discharging of electrodes. This example also includes coupling of a lithium-silicon-carbon coated electrode/anode with a non-lithiated $V_2O_5$ cathode. It can be appreciated that the cathode material need not be limited to non-lithiated $V_2O_5$ cathode materials and that any galvanic cathode material is also be acceptable. The results of this example demonstrate the feasibility of priming a lithium cell in a galvanic state upon activation (FIG. 20). An excess amount of equivalent lithium within the lithium-silicon-carbon coated electrode/anode was used to ensure complete utilization of the $V_2O_5$ cathode. An electrochemical cell was fabricated with the lithium-silicon-carbon coated and $V_2O_5$ electrodes. The electrochemical cell had a charge profile of about 425 mAh/g and displayed nearly 90% of the specific capacity, when compared to a reference cell have lithium and $V_2O_5$ electrodes a specific capacity of about 486 mAh/g. We believe that is reason for electrochemical cell having the lithium-silicon-carbon coated electrode to have a slightly lower capacity of the cell having the lithium electrode since the former is a lithium composite and the latter a non-composite, non-alloyed lithium metal.

Example 6—Development of a Detailed Electrochemical Energy Storage Device and/or System The following example describes some embodiments of the present disclosure related to electrode design and fabrication, as well as electrochemical energy storage device and/or system design and fabrication. Moreover, the following example describes embodiments related to cell deign to achieve one or more of maximal cell energy and an activation time of less than 1 second. FIG. 4 contains an electrochemical energy storage device and/or system design according to some embodiments of the present disclosure. Activation times are prohibitively long with traditional large format reserve batteries (e.g., thermal batteries) due to an activation mechanism that initiates at the electrochemical energy storage device and/or system extremities and propagates to the interior of the cell. Some of the embodiments of the present disclosure describe an electrochemical energy storage device and/or system design that allows for a homogenous activation throughout the electrochemical energy storage device and/or system face (defined as across the x/y axis of the electrochemical device). It can be appreciated that the homogenous activation throughout the electrochemical storage device and/or system face is substantially independent of battery size. With such an approach, a large format battery can be activated on a small format battery time scale. Moreover, the approach also affords the opportunity to tune the rise time and energy density according to the end-use application.

In accordance with some embodiments of the present disclosure, the electrochemical energy storage device and/or system design can include the incorporation of one or more of a plurality of voids, apertures, channels, and grooves to name a few. Typically, a laser ablation process is utilized to form the one or more of the plurality of voids, apertures, channels, and grooves. Moreover, one or both of the opposing electrode faces are laser ablated. That is, the one or both of the opposing electrodes faces can contain the one or more of the plurality of voids, apertures, channels, and grooves. It can be appreciated that the one or more of electrochemical energy storage devices and/or systems comprising the sub-cell stacks can contain one or more electrodes having the one or more of the plurality of voids, apertures, channels, and grooves.

Figure 21:
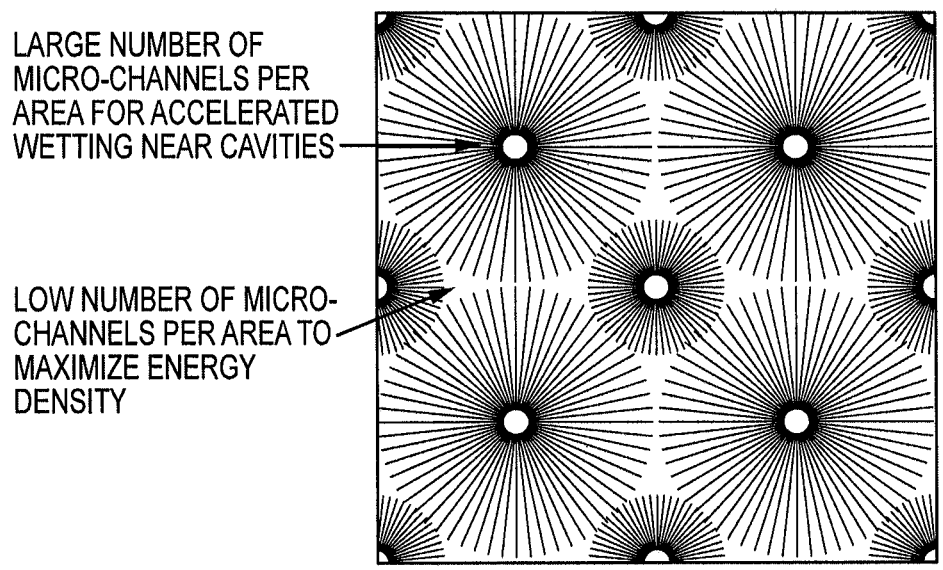
FIG. 21 depicts a laser-ablated electrode having channels and/or grooves and voids and/or apertures according to some embodiments of the present disclosure.
Figure 22:
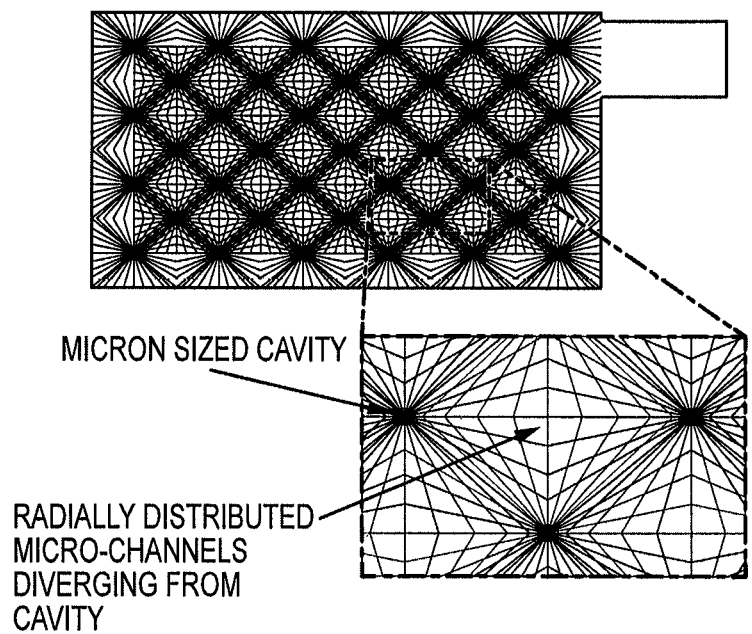
FIG. 22 depicts a laser-ablated electrode having channels and/or grooves and voids and/or apertures according to some embodiments of the present disclosure.

In some embodiments, the one or more of the plurality of voids, apertures, channels, and grooves 2100 can be configured to extend radially outward from the corresponding perforation, void, aperture, hole, or cavity 2104 throughout each electrode (FIG. 21). The radial configuration of the one or more of the plurality of perforations, voids, apertures, cavities, holes, channels, and grooves can direct an electrolyte throughout the electrode face. It can be appreciated that the one or more of the plurality of perforations, voids, apertures, cavities, holes, channels, and grooves can homogenously direct the electrolyte throughout the electrode face. FIG. 22 depicts a non-limiting example of a radial configuration of the one or more of the plurality of perforations, voids, apertures, cavities, holes, channels, and grooves on an electrode surface; more specifically an example where multiple 30 μm width channels extend radially from several 500 μm apertures. The apertures interconnected by radially distributed channels are expected to provide a route for the homogenous, rapid infusion of electrolyte throughout the electrode face. It is believed that the rapid electrolyte wetting of each electrode surface near the apertures and/or voids can provide the allotted voltage demand under load. Moreover, the channels can diverge radially from the perforation, void, aperture, cavity, or hole to maximize energy density in the electrochemical energy storage devices and/or systems by limiting the amount of ablated material.

Example 7—Development of a Rigid Enclosure and Activation

Figure 23:
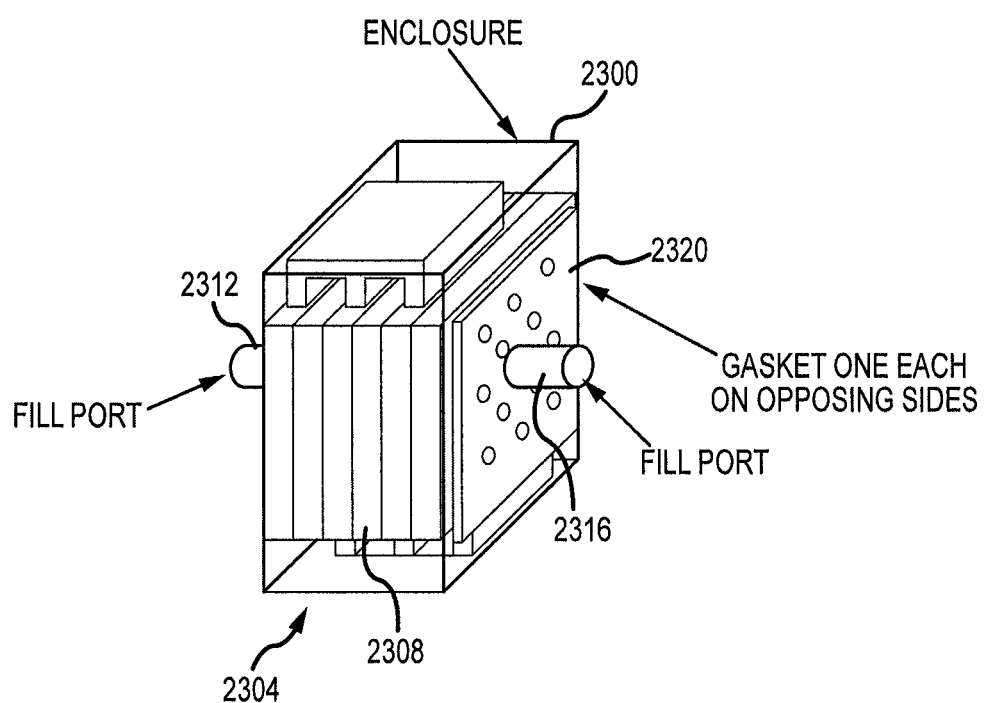
FIG. 23 depicts an electrochemical device or system according to an embodiment.

The following example describes some embodiments of the present disclosure related to electrochemical energy storage devices and/or systems design and fabrication, specifically to an electrochemical energy storage devices and/or systems design and fabrication having a rigid enclosure. Moreover, the example also includes some embodiments relation the activation of the electrochemical energy storage devices and/or systems. In some embodiments, the electrochemical energy storage devices and/or systems have a hermetically sealed enclosure. FIG. 23 depicts a cut-away view of an enclosure 2300 that can encompass the electrochemical system 2304 comprising plural stacked corrugated electrodes 2308. Furthermore, the electrochemical system can have fill ports 2312 and 2316 on each side (towards the sub-cell face) of the enclosure 2300. The fill ports 2312 and 2316 can permit one or more of evacuation of a fluid from the electrochemical system (such as, removing one or more of liquid or gas from the electrochemical system to create a vacuum within the system) and electrolyte addition. A thin gasket 2320 on each side of the sub-cell can form a seal between the exterior face(s) of the stack to the inner face of the enclosure. The seal formed can be a hermetic seal and limit the void volume to that of only the cell stack.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A battery comprising at least one electrode having a thickness, wherein the at least one electrode comprises a plurality of first and second corrugation features, wherein the first corrugation feature comprises one or more perforations, voids, apertures, cavities, and holes that pass through the thickness of the at least one electrode, wherein the second corrugation feature comprises a plurality of channels and/or grooves that extend outwardly from the first corrugation feature, wherein the first and second corrugation features are configured to establish fluid communication between the plurality of first and second corrugation features when an electrolyte contacts the plurality of first and second corrugation features.

2. The battery of claim 1, wherein the at least one electrode has an active surface, wherein at least about 0.1% of the active surface comprises or is part of the first and/or second corrugation feature(s), wherein no more than about 50% of the active surface comprises or is part of the first and/or second corrugation feature(s), and wherein the first and second corrugation features are formed by one or more of a machining process, chemical deposition, physical deposition, masking, and etching.

3. The battery of claim 2, wherein at least about 1% of the active surface comprises or is part of the first and/or second corrugation feature(s), wherein no more than about 45% of the active surface comprises or is part of the first and/or second corrugation feature(s), wherein the plurality of channels and/or grooves of the second corrugation feature define a pattern, wherein the pattern is a grid comprising first channels and/or grooves substantially parallel to one another and second channels and/or grooves substantially parallel to one another, and wherein the first channels and/or grooves are transverse to and intersect the second channels and/or grooves.

4. The battery of claim 2, wherein at least about 1% of the active surface comprises or is part of the first and/or second corrugation feature(s), wherein no more than about 45% of the active surface comprises or is part of the first and/or second corrugation feature(s), and wherein the second corrugation feature comprises a plurality of channels and/or grooves extending radially outwardly from the first corrugation feature.

5. The battery of claim 1, wherein the at least one electrode is an anode or a cathode comprising first and second sides, wherein the first corrugation feature has a width of at least about 1 micron, wherein the first corrugation feature extends through the thickness of the at least one electrode from the first side to the second side, wherein the second corrugation feature has an average, mean and/or mode width or depth of at least about 10 microns and no more than about 1 millimeter.

6. The battery of claim 1, wherein an average, mean and/or mode width of the first corrugation feature is greater than an average, mean and/or mode width of the second corrugation feature.

7. The battery of claim 1, wherein the at least one electrode comprises multiple electrodes stacked one-above-the-other or wrapped one-about-the-other, each of the multiple electrodes comprising first and second corrugation features, wherein an ion permeable separator is positioned between each pair of adjacent electrodes, wherein the one or more perforations, voids, apertures, cavities, and holes of the first corrugation features are aligned relative to one another to define a passage for the electrolyte through the multiple electrodes, wherein the first corrugation feature has a width of at least about 50 microns, and wherein the second corrugation feature has an average, mean and/or mode width or depth of at least about 15 microns.

8. The battery of claim 1, wherein the at least one electrode comprises a plurality of first corrugation features and a plurality of second corrugation features and wherein one or more of the following are true:
   (i) the second corrugation feature has an average width that when a network of orientated channels and/or grooves is contacted with the electrolyte, the electrolyte flows and wets an active surface of the at least one electrode in no more than about one second; and
   (ii) the first corrugation feature has an average diameter that when a pattern of apertures and/or voids is contacted with the electrolyte, the electrolyte flows and wets the active surface of the at least one electrode in no more than about one second.

9. A battery comprising:
an anode comprising first and second opposing sides; and
a cathode comprising first and second opposing sides,
   wherein one or both of the anode and the cathode have a plurality of corrugation features comprising first and second corrugation features, wherein the first corrugation feature comprises one or more perforations, voids, apertures, cavities, and holes that pass through the first side to the second side of one or both of the anode and the cathode, wherein the second corrugation feature comprises a plurality of channels and/or grooves that extend outwardly from the first corrugation feature, and wherein the first and second corrugation features are configured to establish fluid communication between the first and second corrugation features in the plurality of corrugation features when an electrolyte comprising a fluid contacts the plurality of corrugation features.

10. The battery of claim 9, wherein the anode and the cathode each have an active surface, wherein at least about 0.1% of an active surface of the anode and/or cathode comprises or is part of the first and/or second corrugation feature(s), wherein no more than about 50% of the active surface of the anode and/or the cathode comprises or is part of the first and/or second corrugation feature(s), and wherein the first and second corrugation features are formed by one or more of a machining process, chemical deposition, physical deposition, masking, and etching.

11. The battery of claim 10, wherein at least about 1% of the active surface comprises or is part of the first and/or second corrugation feature(s), wherein no more than about 45% of the active surface comprises or is part of the first and/or second corrugation feature(s), wherein the plural channels and/or grooves of the second corrugation feature define a pattern, wherein the pattern is a grid comprising first channels and/or grooves substantially parallel to one another and second channels and/or grooves substantially parallel to one another, and wherein the first channels and/or grooves are transverse to and intersect the second channels and/or grooves.

12. The battery of claim 10, wherein at least about 1% of the active surface comprises or is part of the first and/or second corrugation feature(s), wherein no more than about 45% of the active surface comprises or is part of the first and/or second corrugation feature(s), and wherein the second corrugation feature comprises plural channels and/or grooves extending radially outwardly from the first corrugation feature.

13. The battery of claim 9, wherein the anode or the cathode comprises one or more of carbon, an alkali metal, an alkaline earth metal, and a transition metal, wherein the first corrugation feature has a width of at least about 1 micron, and wherein the second corrugation feature has an average, mean and/or mode width or depth of no more than about 1 millimeter.

14. The battery of claim 9, wherein the anode and/or the cathode comprises lithium, wherein the first corrugation feature has a width of at least about 20 microns, and wherein the second corrugation feature has an average, mean and/or mode width or depth of at least about 10 microns.

15. The battery of claim 9, wherein one of the anode or the cathode is stacked on the other of the anode or the cathode or wrapped around the other of the anode or the cathode, each of the anode and the cathode comprising first and second corrugation features, wherein an ion permeable separator is positioned between the anode and the cathode, wherein the one or more perforations, voids, apertures, cavities, and holes of the first corrugation features are aligned relative to one another to define a passage for the electrolyte through the anode and the cathode, wherein the first corrugation feature has a width of at least about 50 microns, and wherein the second corrugation feature has an average, mean and/or mode width or depth of at least about 15 microns.

16. The battery of claim 9, wherein the anode and/or the cathode comprises a plurality of first corrugation features and a plurality of second corrugation features and wherein one or more of the following are true:
  (i) the plurality of second corrugation features have a sufficient average width to establish the fluid communication between the first and second corrugation features in no more than about one second; and
  (ii) the first corrugation feature has a sufficient average diameter to establish the fluid communication between the first and second corrugation features in no more than about one second.

17. A battery having:
a first electrode; and
a second electrode, wherein one or both of the first and second electrodes comprise a plurality of corrugation features comprising first and second corrugation features, wherein the first corrugation feature comprises one or more perforations, voids, apertures, cavities and holes that pass through a thickness of the at least one electrode, wherein the second corrugation feature comprises a plurality of channels and/or grooves that extend outwardly from the first corrugation feature, wherein an electrolyte is introduced into the battery by passing, via the first corrugation feature, the electrolyte through one of the first and second electrodes and contacting at least a portion of the electrolyte with the other of the first or second electrode, wherein at least one of the first and second electrodes comprises a second corrugation feature in fluid communication with the first corrugation feature to contact the electrolyte across a portion of an active surface of the at least one of the first and second electrodes.

18. The battery of claim 17, wherein at least one of the one or more perforations, voids, apertures, cavaties and holes of the first corrugation features is aligned substantially with at least one of the channels and/or grooves of the second corrugation features to form at least one passage to enable the electrolyte to flow through one or both of the first and second electrodes.

19. The battery of claim 17, further comprising an ion separator positioned between the first and second electrodes, wherein the ion separator comprises a plurality of passages extending through the ion separator to enable the electrolyte to flow through the ion separator.

20. The battery of claim 1, wherein the battery is a primary or secondary battery.

21. The battery of claim 1, wherein the electrolyte is a liquid or a paste electrolyte.

22. The battery of claim 7, wherein the ion-permeable separator is selected from the group consisting of polymer film, non-woven fibers, and naturally occurring substance.

* * * * *